United States Patent
Hayashi

(10) Patent No.: US 7,656,844 B2
(45) Date of Patent: Feb. 2, 2010

(54) RADIO TRANSMISSION APPARATUS AND RADIO RECEPTION APPARATUS IN A CDMA COMMUNICATION SYSTEM

(75) Inventor: Masaki Hayashi, Yokosuka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 10/868,029

(22) Filed: Jun. 16, 2004

(65) Prior Publication Data

US 2004/0233875 A1      Nov. 25, 2004

Related U.S. Application Data

(63) Continuation of application No. 09/606,906, filed on Jun. 30, 2000, now Pat. No. 6,765,894.

(30) Foreign Application Priority Data

| Jul. 5, 1999 | (JP) | ................................. 11-190050 |
| Nov. 22, 1999 | (JP) | ................................. 11-331391 |
| Mar. 13, 2000 | (JP) | ............................. 2000-068426 |

(51) Int. Cl.
    *H04B 7/216*    (2006.01)
(52) U.S. Cl. ....................... 370/335; 370/342
(58) Field of Classification Search ................. 370/335, 370/342, 350, 503, 508, 509, 510, 519; 375/145, 375/149
    See application file for complete search history.

(56) References Cited

U.S. PATENT DOCUMENTS

| 5,414,699 | A | * | 5/1995 | Lee .............................. 370/342 |
| 5,420,863 | A | * | 5/1995 | Taketsugu et al. ........... 370/337 |
| 5,434,905 | A | | 7/1995 | Maeda et al. |
| 5,444,743 | A | | 8/1995 | Scarpa |
| 5,519,404 | A | * | 5/1996 | Cances et al. ............... 342/354 |
| 5,982,763 | A | | 11/1999 | Sato |
| 6,078,607 | A | * | 6/2000 | Monroe et al. .............. 375/145 |
| 6,219,345 | B1 | * | 4/2001 | Clark et al. ................. 370/337 |

(Continued)

FOREIGN PATENT DOCUMENTS

EP        0767557        4/1997

(Continued)

OTHER PUBLICATIONS

Japanese Office Action with English Translation dated Aug. 23, 2005.

(Continued)

*Primary Examiner*—Ricky Ngo
*Assistant Examiner*—Christine Ng
(74) *Attorney, Agent, or Firm*—Dickinson Wright PLLC

(57) ABSTRACT

Reception section 602 receives a signal on which signals of channels are multiplexed in a same frequency band through antenna 601. Separation section 603 separates a part used for correlation value calculation in the reception signal. Correlation sections 604 and 605 create delay profiles by calculating a correlation value using a 1st basic code and 2nd basic code for the signals after the separation, respectively. Comparison/channel estimation section 606 cycles each delay profile so that the delay profiles match in a section in which the path of the channel to be detected appears when there is no propagation delay and detects a quasi-matching path in each delay profile after the cycling.

8 Claims, 33 Drawing Sheets

U.S. PATENT DOCUMENTS

| | | | |
|---|---|---|---|
| 6,275,506 B1 * | 8/2001 | Fazel et al. | 370/478 |
| 6,339,612 B1 * | 1/2002 | Stewart et al. | 375/140 |
| 6,470,001 B1 | 10/2002 | Kim et al. | |
| 6,480,523 B1 | 11/2002 | Kondo | |
| 6,522,644 B2 * | 2/2003 | Bergkvist | 370/350 |
| 6,522,864 B1 * | 2/2003 | Febvre et al. | 455/12.1 |
| 6,594,248 B1 * | 7/2003 | Karna et al. | 370/342 |
| 6,597,675 B1 * | 7/2003 | Esmailzadeh et al. | 370/335 |
| 6,606,314 B1 * | 8/2003 | Bahrenburg et al. | 370/347 |
| 6,674,765 B1 * | 1/2004 | Chuah et al. | 370/458 |
| 6,775,260 B1 * | 8/2004 | Dabak et al. | 370/342 |
| 2002/0006122 A1 * | 1/2002 | Zeira | 370/335 |

FOREIGN PATENT DOCUMENTS

| | | |
|---|---|---|
| EP | 1075158 | 2/2001 |
| EP | 1176739 | 1/2002 |
| JP | 10-163919 | 6/1998 |
| JP | 2894340 | 3/1999 |
| JP | 200160894 | 3/2001 |
| WO | 9739550 | 10/1997 |
| WO | 9844655 | 10/1998 |
| WO | 9907084 | 2/1999 |
| WO | 9912273 | 3/1999 |
| WO | 9922475 | 5/1999 |
| WO | 0167639 | 9/2001 |

OTHER PUBLICATIONS

U.S. Appl. No. 60/143,574, filed Jul. 13, 1999, Cover page, pp. 1-3.
European Search Report dated May 8, 2006.
Japanese Office Action dated Aug. 8, 2006 with English translation.
Japanese Office Action dated Nov. 4, 2008 with English translation.

* cited by examiner

| | Ch-1 | Ch-2 | Ch-3 | Ch-4 | Ch-5 | Ch-6 | Ch-7 | Ch-8 |
|---|---|---|---|---|---|---|---|---|
| ASSIGNMENT PATTERN 1 | PHASE 8 | PHASE 7 | PHASE 6 | PHASE 5 | PHASE 4 | PHASE 3 | PHASE 2 | PHASE 1 |
| ASSIGNMENT PATTERN 2 | PHASE 1 | PHASE 2 | PHASE 3 | PHASE 4 | PHASE 5 | PHASE 6 | PHASE 7 | PHASE 8 |

FIG. 18

| TIME | ... | T−1 | T+0 | T+1 | T+2 | T+3 | T+4 | ... |
|---|---|---|---|---|---|---|---|---|
| ASSIGNMENT CHANGE PATTERN 1 | ... | 2 | 1 | 2 | 1 | 2 | 1 | ... |

FIG. 19

| | Ch-1 | Ch-2 | Ch-3 | Ch-4 | Ch-5 | Ch-6 | Ch-7 | Ch-8 |
|---|---|---|---|---|---|---|---|---|
| ASSIGNMENT PATTERN 2 | PHASE 1 | PHASE 2 | PHASE 3 | PHASE 4 | PHASE 5 | PHASE 6 | PHASE 7 | PHASE 8 |
| ASSIGNMENT PATTERN 3 | PHASE 1 | PHASE 4 | PHASE 3 | PHASE 6 | PHASE 5 | PHASE 8 | PHASE 7 | PHASE 2 |
| ASSIGNMENT PATTERN 4 | PHASE 1 | PHASE 6 | PHASE 3 | PHASE 8 | PHASE 5 | PHASE 2 | PHASE 7 | PHASE 4 |
| ASSIGNMENT PATTERN 5 | PHASE 1 | PHASE 8 | PHASE 3 | PHASE 2 | PHASE 5 | PHASE 4 | PHASE 7 | PHASE 6 |

FIG. 27

| TIME | ... | T−1 | T+0 | T+1 | T+2 | T+3 | T+4 | ... |
|---|---|---|---|---|---|---|---|---|
| ASSIGNMENT CHANGE PATTERN 2 | ... | 5 | 2 | 3 | 4 | 5 | 2 | ... |

FIG. 28

RADIO TRANSMISSION APPARATUS AND RADIO RECEPTION APPARATUS IN A CDMA COMMUNICATION SYSTEM

This is a continuation of application Ser. No. 09/606,906 filed Jun. 30, 2000.

BACKGROUND OF THE INVENTION

1. Field of the Invention

The present invention relates to a communication apparatus based on a spread spectrum communication system, and more particularly, to a communication apparatus, which carries out radio communications using a signal with a known signal for creating a delay profile added.

2. Description of the Related Art

Conventionally, the following apparatus is known as a communication apparatus, which carries out radio communications using a signal with a known signal for creating a delay profile added. Hereinafter, a case where a CDMA (Code Division Multiple Access) system is used as a spread spectrum communication system will be explained as an example.

A base station in a CDMA-based communication receives a signal on which signals of a plurality of channels are multiplexed in an identical frequency band through a transmission path at an identical time. This base station can extract a transmitted signal from each channel (each mobile station) from the reception signal by performing despreading processing using a spreading code assigned to each channel.

However, when the distance between each mobile station, which transmits a signal on each channel and the above base station, is large, a delay (hereinafter referred to as "propagation delay") occurs by the time the signal on each channel reaches the above base station. Moreover, when the distance between each mobile station and the above base station differs from one station to another, the propagation delay also varies from one channel to another.

Therefore, the above base station needs to detect a propagation delay for every channel and perform despreading processing at timing taking account of the detected propagation delay. Therefore, conventionally, each mobile station transmits a signal with a mid amble section which is created using a known basic code added, while the base station detects a propagation delay for every channel (every mobile station) by carrying out correlation value calculation processing using the reception signal on which signals transmitted from different mobile stations are multiplexed and the above known basic code. Hereinafter, the method of detecting a propagation delay using a mid amble section in the conventional CDMA communication system will be explained.

First, the signal transmitted by each mobile station (each channel) is explained with reference to FIG. 1 and FIG. 2. FIG. 1 is a schematic diagram showing the procedure for creating a mid amble pattern in the conventional CDMA communication system. FIG. 2 is a schematic diagram showing transmission timing in each mobile station in the conventional CDMA communication system. Here, suppose there are eight mobile stations which carry out radio communications with the base station apparatus.

As shown in FIG. 1, the pattern of the mid amble section which is used for each channel (hereinafter referred to as "mid amble pattern") is created according to the procedure shown below using a basic code which cycles for every 456 (=8 W) chips. This basic code is known to the base station and contains eight blocks A to H which has a code with mutually different W (=57) chip length.

First, as the 1st step, a reference block is set in the above basic code. Here, suppose the reference block is "A".

As a 2nd step, the above reference block is shifted by $\{W \times (n-1)\}$ to the left in the figure for every channel. Here, W=57 chips and n denotes the number of the channels. The phase to be shifted is 0, W, 2 W and 7 W for channel 1, channel 2, channel 3 and channel 8, respectively. With this, the reference block on each channel is "A", "B", "C" and "H" for channel 1, channel 2, channel 3 and channel 8, respectively.

As a 3rd step, 513 chips are extracted from the forefront of the reference block whose phase is shifted in the 2nd step in the above basic code for every channel. This creates a 513-chip mid amble pattern for every channel as a whole. Moreover, as for each 513-chip mid amble pattern, the first one chip of the first block is removed. In this way, a 512-chip mid amble pattern is created for every channel as a whole. In FIG. 1, the first block in the 512-chip mid amble pattern created for every channel is equivalent to the last block whose first one chip is removed. For example, in the case of channel 1, first block "A'" corresponds to the last block "A" whose first one chip is removed.

Next, as shown in FIG. 2, each mobile station transmits the transmission signal with the mid amble pattern of each channel created using the above procedure added to the base station apparatus. That is, each mobile station transmits the transmission signal for which a mid amble pattern for every mobile station is added to the mid amble section between data section 1 and data section 2 at the same timing as that of the other mobile stations.

On the other hand, the base station receives a signal on which transmission signals transmitted from the mobile stations are multiplexed in a same frequency band.

Correlation value calculation processing using a reception signal in the base station and the above known basic code will be explained with reference to FIG. 3 and FIG. 4. FIG. 3 is a schematic diagram conceptually showing a situation in which the base station in the conventional CDMA communication system receives a transmission signal for every channel. FIG. 4 is a schematic diagram showing an example of a delay profile obtained by the correlation value calculation processing in the base station in the conventional CDMA communication system.

As described above, since each mobile station is distant from the base station and in addition the distance between each mobile station and the base station varies from one station to another, as shown in FIG. 3, by the time the signal transmitted by each mobile station arrives at the base station, a propagation delay is produced and moreover this propagation delay varies for every signal transmitted by each mobile station. That is, the delay times produced by the time the signal transmitted from each of mobile stations 1, mobile station 2, mobile station 3 and mobile stations 8 arrives at the base station are propagation delay 1, propagation delay 2, propagation delay 3 and propagation delay 8, respectively. The signal, which the base station receives, is a signal on which the transmission signals from the mobile stations with the propagation delays mainly shown in FIG. 3 are multiplexed.

The base station carries out correlation value calculation processing to extract a transmission signal of each mobile station from such a reception signal. Hereinafter, the correlation value calculation processing in the base station will be explained. First, of the reception signal of 512 chips received from reference time 13, only 456 chips are extracted from last part 12. Here, the reference time refers to the time that the first part (for example, first part 11 in the case of channel 1) in each mid amble section in the signal transmitted by each mobile station is received by the base station when there is no propagation delay.

Next, a value of a correlation between the extracted 456-chip reception signal and the above known cyclic basic code is calculated. That is, using the above known cyclic basic code shown in FIG. 4 as the reference, the above 456-chip reception signal is multiplied by the above basic code while shifting the phase of the above 456-chip reception signal by 1 chip at a time and a correlation value at each phase is calculated.

By such correlation value calculation processing, a delay profile on each channel as shown in FIG. 4 is obtained. During the calculation of the above correlation value, when the mid amble pattern from one of the mobile stations contained in the above 456-chip reception signal matches the above known basic code, the correlation value reaches a maximum and the path of a certain size appears.

Therefore, the time at which the size of each of path 21, path 22, path 23 and path 24 reaches a maximum corresponds to when each mid amble pattern from the mobile station 1, mobile station 2, mobile station 3 and mobile station 8 contained in the above 456-chip reception signal matches the cyclic basic code in FIG. 4.

Here, when there is no propagation delay in each mobile station, the time at which the path corresponding to each mobile station reaches a maximum is known. Therefore, the propagation delay which occurs by the time the signal actually transmitted from each mobile station reaches the base station is detected by referring to the time at which the size of the path corresponding to each mobile station when there is no propagation delay reaches a maximum. For example, the propagation delay which corresponds to each of mobile station 1, mobile station 2, mobile station 3 and mobile station 8 is detected in chip units as propagation delay 1, propagation delay 2, propagation delay 3 and propagation delay 8 as shown in FIG. 4. Propagation delay 1, propagation delay 2, propagation delay 3 and propagation delay 8 shown in FIG. 4 are propagation delay 1, propagation delay 2, propagation delay 3 and propagation delay 8 in FIG. 3 expressed on a delay profile.

Also, when the total of a propagation delay and delay dispersion in each mobile station is smaller than the W chip length, the section where a path of a certain size appears on the delay profile is decided for each mobile station. That is, in the above case, the paths, which correspond to mobile station 1 to mobile station 8, appear in the W chip sections 1 to 8 (the delay profile width) in the delay profile shown in FIG. 4.

As mentioned above, it is possible to perform interference removal and demodulation of the data section for every mobile station by carrying out despreading processing using the data section at the timing taking account of a propagation delay for every mobile station detected as shown above.

Moreover, the base station can perform time alignment control using the propagation delay for every each mobile station detected as described above. That is, the base station sets transmission timing for every mobile station based on the propagation delay for every mobile station detected and reports the transmission timing set to each mobile station, and each mobile station transmits to the base station according to the transmission timing reported by the base station. By such time alignment control, the base station can control variations of the reception timing among mobile stations.

However, as the cell radius of the above conventional CDMA communication system grows, the farther the mobile station from the base station, the greater the propagation delay of the signal transmitted from the mobile station becomes and the total of the propagation delay and the delay dispersion of this signal may become bigger than the W chip length. In this case, the path which corresponds to the above mobile station does not appear in the expected W chip section in the delay profile shown in FIG. 4, but it appears in the other W chip section. For example, in case of mobile station 1, the path, which corresponds to mobile station 1, may appear in W chip sections 2 to 8, instead of W chip section 1 shown in FIG. 4.

Moreover, in the above case, if not only the desired wave but also a delay wave of the signal transmitted from the above mobile station is received by the base station, the path of the delay wave in addition to the path of the desired wave which corresponds to the above mobile station appears in the other W chip section in the above delay profile.

As a result, because the path of the desired wave and the delay wave in the above mobile station does not appear in the expected W chip section in the delay profile obtained, the propagation delay detected in the above mobile station becomes incorrect. Also, because each path of the above mobile station appears in the W chip section which corresponds to the other mobile station in the above delay profile, there is a possibility that each path of the above mobile station will be detected mistakenly as the path of the desired wave and the delay wave of the above other mobile station. Therefore, the propagation delay detected in the mobile stations other than the above mobile station also becomes incorrect.

Therefore, because the correct propagation delay in each mobile station cannot be detected, not only the interference removal and demodulation characteristic deteriorates but also it is difficult to perform time alignment control.

To solve such a problem, there is a method of enlarging the W chip section of each mobile station in the delay profile by extending W. However, because the value obtained by dividing the mid amble section by (number of channels accommodated+1) is equivalent to the delay profile width W of each mobile station, if W is extended, the number of channels accommodated decreases supposing that the mid amble section length is constant.

SUMMARY OF THE INVENTION

It is an object of the present invention to provide a communication apparatus capable of correctly detecting a propagation delay in each mobile station apparatus (each channel) without affecting the number of channels accommodated.

This object is achieved by code-multiplexing or time-multiplexing at least two known reference signals for one channel.

More specifically, a transmission signal is first generated by code-multiplexing at least two known reference signals for one channel of a plurality of mutually different known reference signals at a same time. Moreover, two delay profiles are created through correlation value calculation processing using the transmission signal of each channel on which at least two known reference signals are code-multiplexed at a same time, which are multiplexed in a same frequency band and a 1st reference code and the 2nd reference code, and the delay of each channel is detected by comparing the paths of these delay profiles.

Secondly, a transmission signal is created by time-multiplexing at least two known reference signals for one channel of a plurality of the above mutually different known reference signals every unit time. Moreover, delay profiles corresponding to the above unit time are created through correlation value calculation processing using the transmission signal of each channel on which at least two known reference signals of a plurality of mutually different known reference signals are time-multiplexed in a same frequency band and the cyclic reference codes, and the delay of each channel is detected using the delay profiles created.

Furthermore, this object is also achieved by performing channel estimation about each channel using a value of correlation between a reception signal and a known reference signals and a value of correlation between the reception signal and a spreading code for one channel.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which;

FIG. 18 illustrates a 1st example of a method of assigning a mid amble pattern corresponding to each channel in the communication apparatus according to Embodiment 2 above;

FIG. 19 illustrates a 1st example of how to apply the assignment method shown in FIG. 18 in the communication apparatus according to Embodiment 2 above;

FIG. 27 illustrates a 2nd example of a method of assigning a mid amble pattern for each channel in the communication apparatus according to Embodiment 2 above;

FIG. 28 illustrates a 2nd example of a method of applying the assignment method shown in FIG. 27 in the communication apparatus according to Embodiment 2 above;

DETAILED DESCRIPTION OF THE PREFERRED EMBODIMENTS

With reference now to the attached drawings, embodiments of the present invention will be explained in detail below. Embodiment 1 describes a case where a transmission signal is generated by code-multiplexing at least two known reference signals for one channel. Embodiments 2 and 3 describe cases where a transmission signal is generated by time-multiplexing at least two known reference signals for one channel. Embodiment 4 describes a case where channel estimation is carried out on each channel using a value of correlation between a reception signal and the known reference signal and a value of correlation between the reception signal and a spreading code for one channel.

Embodiment 1

Figure 1:
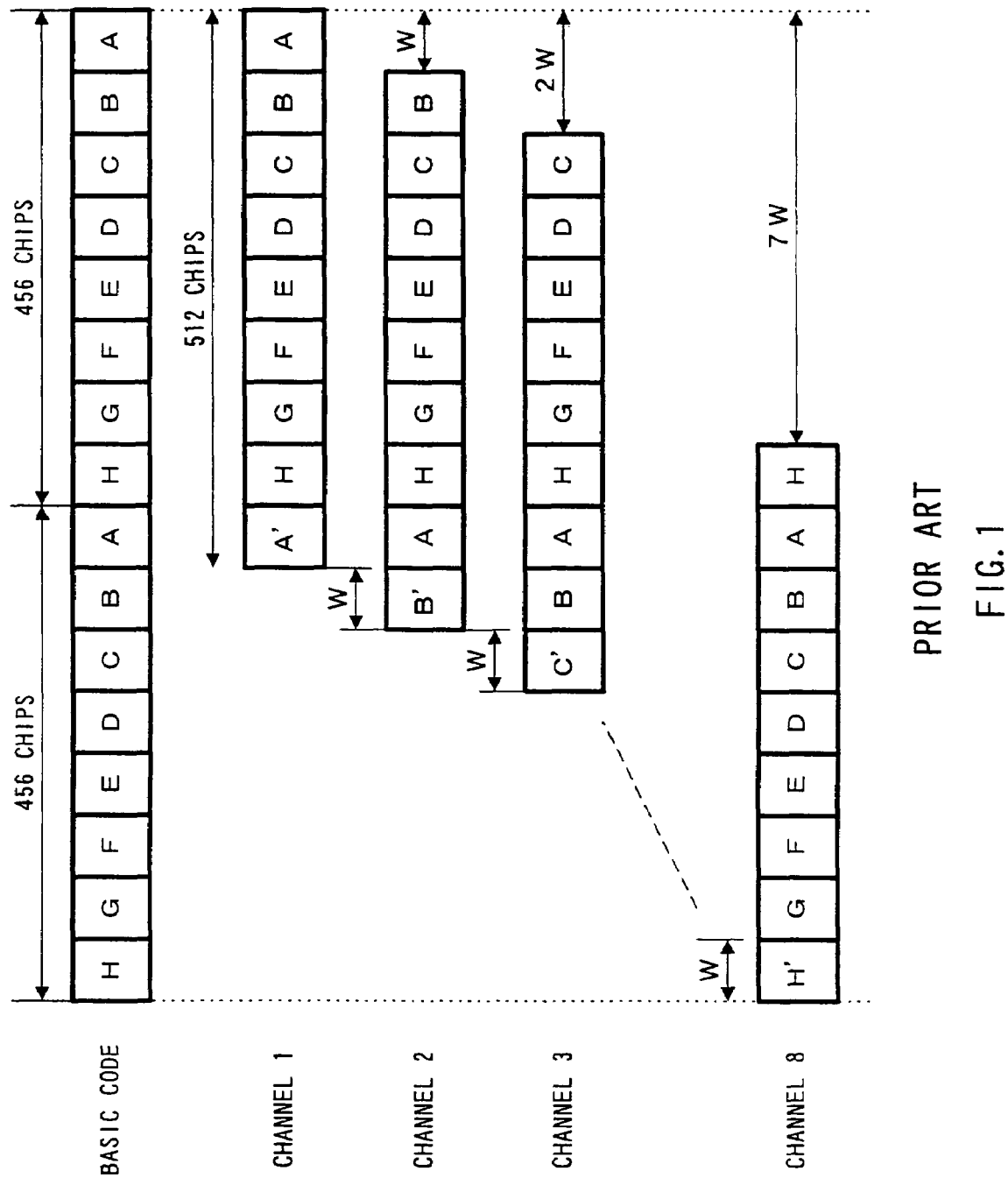
FIG. 1 is a schematic diagram showing a procedure for creating a mid amble pattern in a conventional CDMA communication system.
Figure 2:
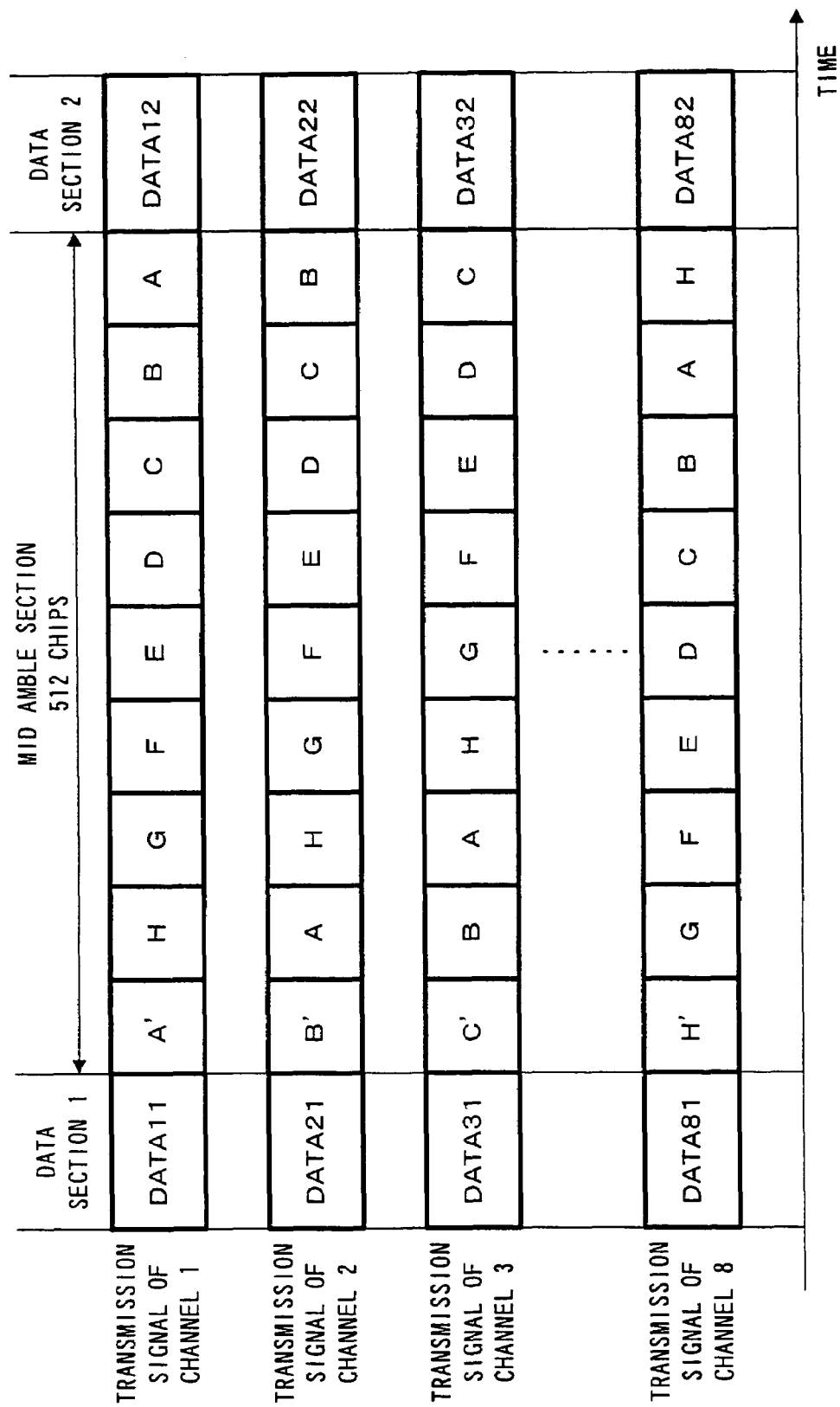
FIG. 2 is a schematic diagram showing transmission timing in each mobile station in the conventional CDMA communication system.
Figure 3:
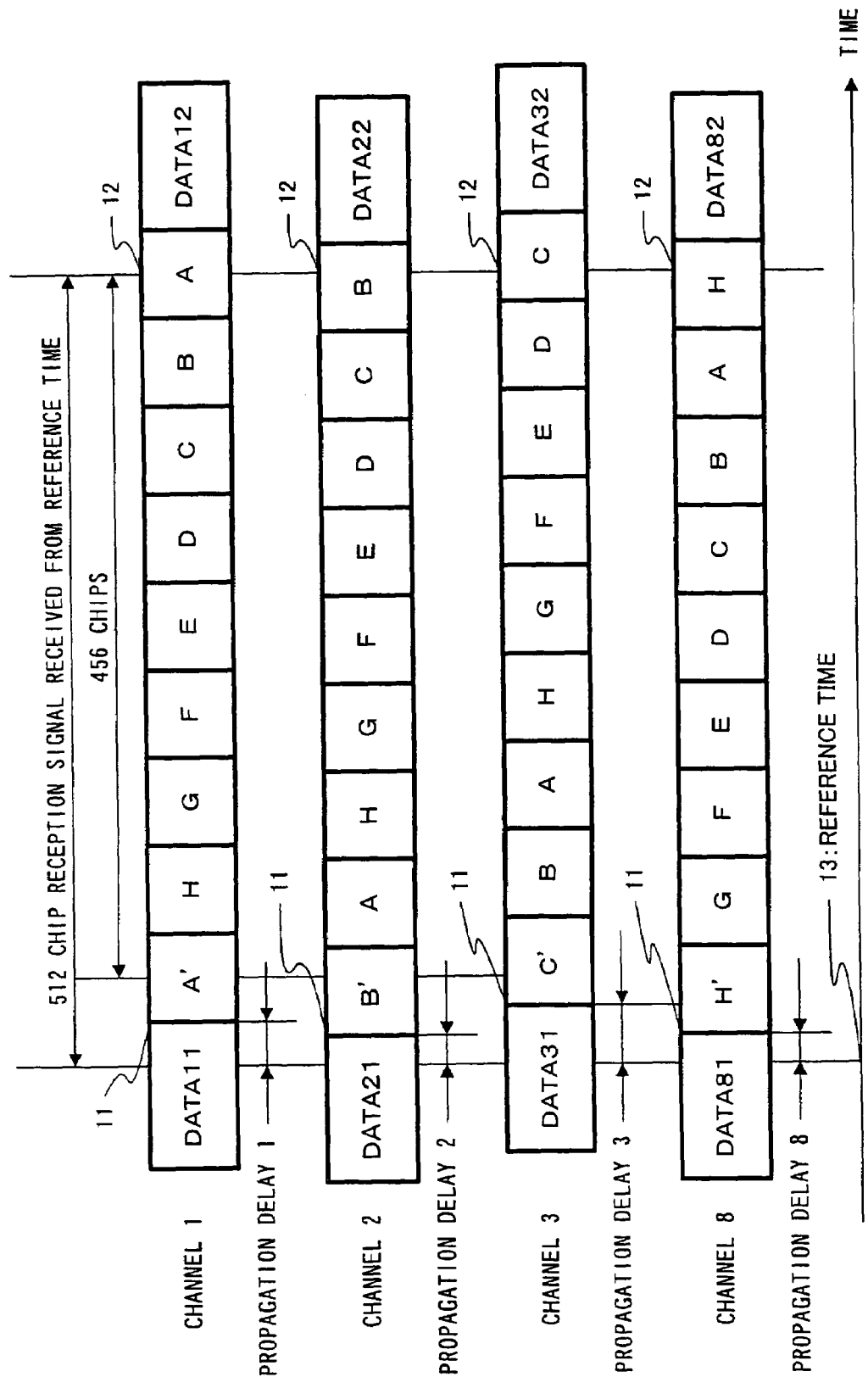
FIG. 3 is a schematic diagram conceptually showing a situation in which the base station in the conventional CDMA communication system receives a transmission signal for every channel.
Figure 4:
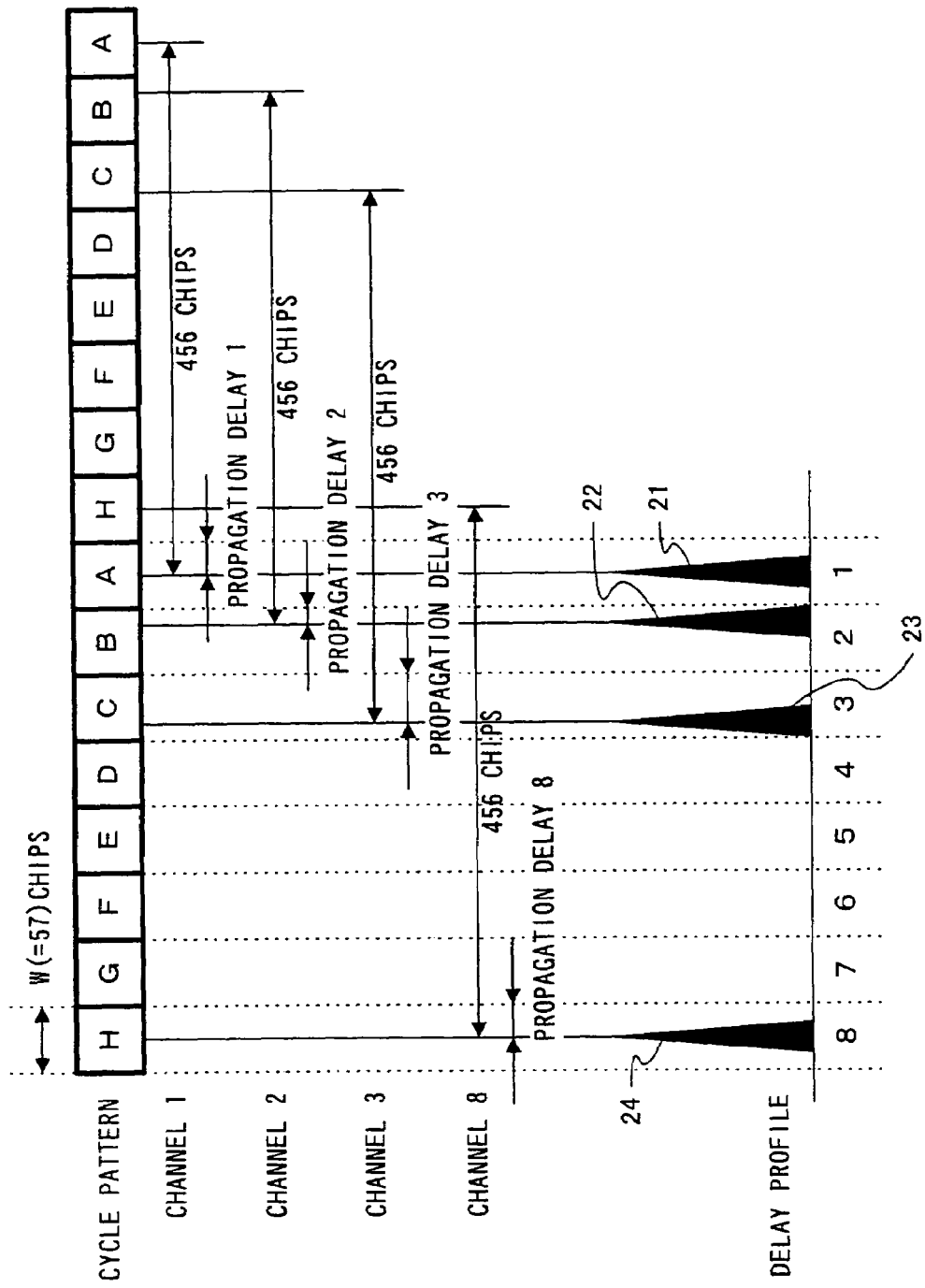
FIG. 4 is a schematic diagram showing an example of a delay profile obtained by correlation value calculation processing in the base station in the conventional CDMA communication system.
Figure 5:
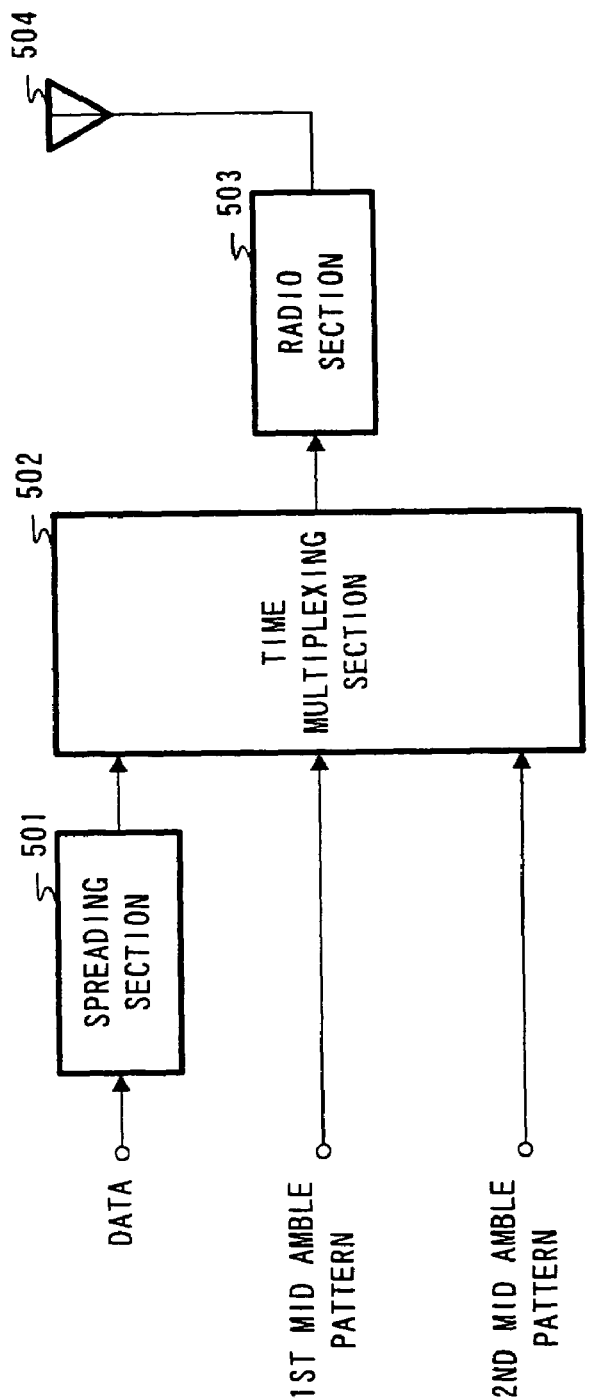
FIG. 5 is a block diagram showing a configuration of a transmitter equipped with the communication apparatus according to Embodiment 1 of the present invention.

FIG. 5 is a block diagram showing a configuration of a transmitter equipped with a communication apparatus according to Embodiment 1 of the present invention. In FIG. 5, spreading section 501 carries out spreading processing on transmission data using a spreading code assigned to a transmission channel of this transmitter. Time multiplexing section 502 creates a transmission signal by multiplexing (code-multiplexing) a mid amble pattern, i.e. the 1st mid amble pattern, and the 2nd mid amble pattern and transmission data after spreading processing frames. As the frame format, a format mainly including data section 1, a mid amble section and data section 2 is used as shown in FIG. 2. Details of the frame format and the mid amble pattern will be described later.

Radio section 503 carries out predetermined transmission processing such as the frequency conversion on the transmission signal created by time multiplexing section 502 and transmits the transmission signal after the above processing through antenna 504.

Figure 6:
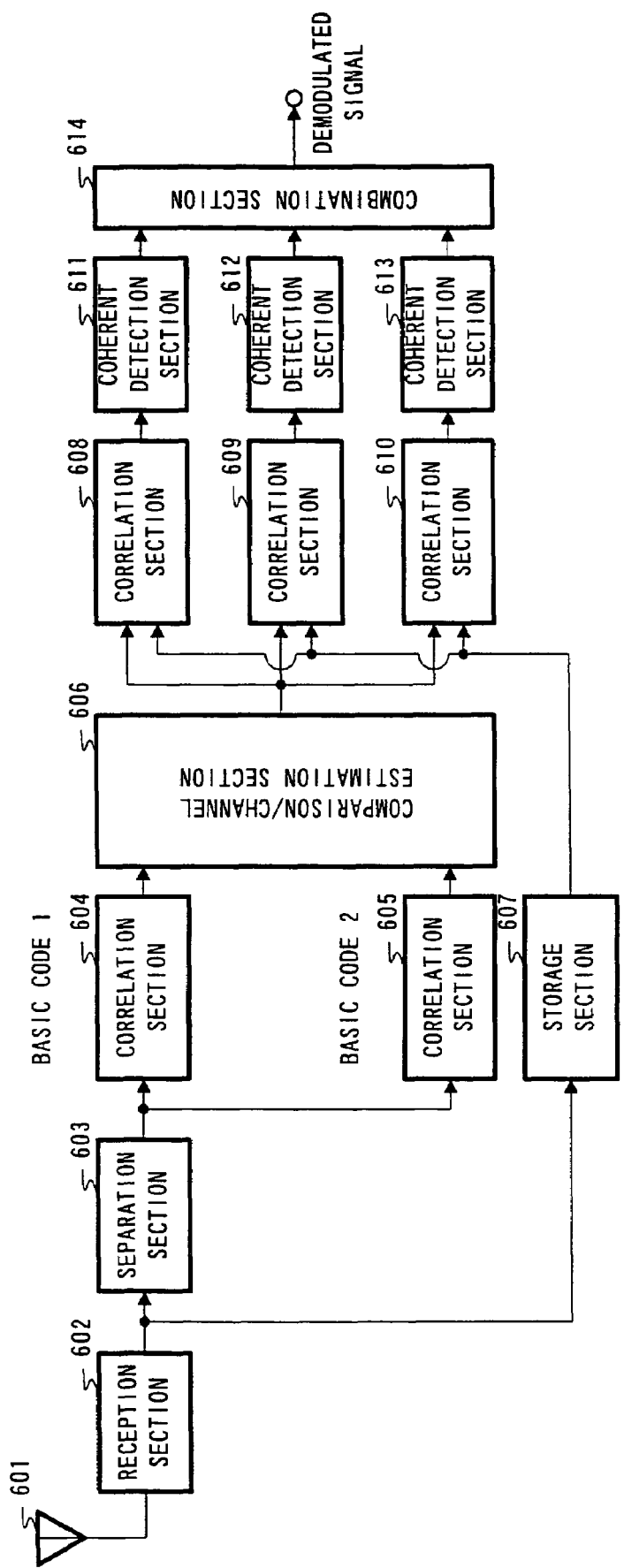
FIG. 6 is a block diagram showing a configuration of a receiver equipped with the communication apparatus according to Embodiment 1 of the present invention.

FIG. 6 is a block diagram showing a configuration of the receiver in the communication apparatus according to Embodiment 1 of the present invention. In FIG. 6, reception section 602 carries out predetermined reception processing such as frequency conversion on the signal (reception signal) received through the antenna and sends the reception signal after the above processing to separation section 603 and storage section 607. This reception signal is a signal on which signals transmitted by the a plurality of transmitters are multiplexed in a same frequency band. Also, the above plurality of transmitters each has the configuration shown in FIG. 5 and outputs a signal to the receiver shown in FIG. 6 using different channels.

Storage section 607 stores the reception signal after the above processing and outputs it to the correlation sections 608 to 610, which will be described later. Separation section 603 separates a signal corresponding to 512 chips received from a reference time of the reception signal after the above processing. Correlation section 604 carries out correlation value calculation processing using the reception signal corresponding to the separated 512 chips and basic code 1 assigned to each channel and creates a delay profile using the calculated correlation value.

Correlation section 605 carries out correlation value calculation processing using the reception signal corresponding to the separated 512 chips and basic code 2 assigned to each channel and creates a delay profile using the calculated correlation value.

Comparison/channel estimation section 606 performs channel estimation for each channel using a delay profile created by each of the correlation sections 604 and 605. That is, comparison/channel estimation section 606 detects the path for each channel and delay propagation of this path using the above delay profile.

Correlation sections 608 to 610 carry out despreading processing on a reception signal from reception section 602 using the spreading code assigned to each channel based on the channel estimation result by comparison/channel estimation section 606. Coherent detection sections 611 to 613 carry out coherent detection processing on the signal subjected to despreading processing by correlation sections 608 to 610, respectively. Combination section 614 combines the signals subjected to coherent detection processing by coherent detection sections 611 to 613 and outputs a demodulated signal.

FIG. 6 shows, as the example, a configuration with 3 lines of correlation sections and coherent detection sections to explain a case where three paths are handled for each channel, but the present invention is also applicable when the number of lines of correlation sections and coherent detection sections are changed as appropriate.

Next, the method of creating a mid amble pattern used for each channel will be explained with reference to FIG. 7 and FIG. 8. Here, a case where mid amble patterns for 8 channels are created is explained. In this embodiment, two mid amble patterns, a 1st mid amble pattern (a 1st code) and a 2nd mid amble pattern (a 2nd code), are assigned to each channel. First, the procedure for creating the 1st mid amble pattern is explained with reference to FIG. 7.

Figure 7:
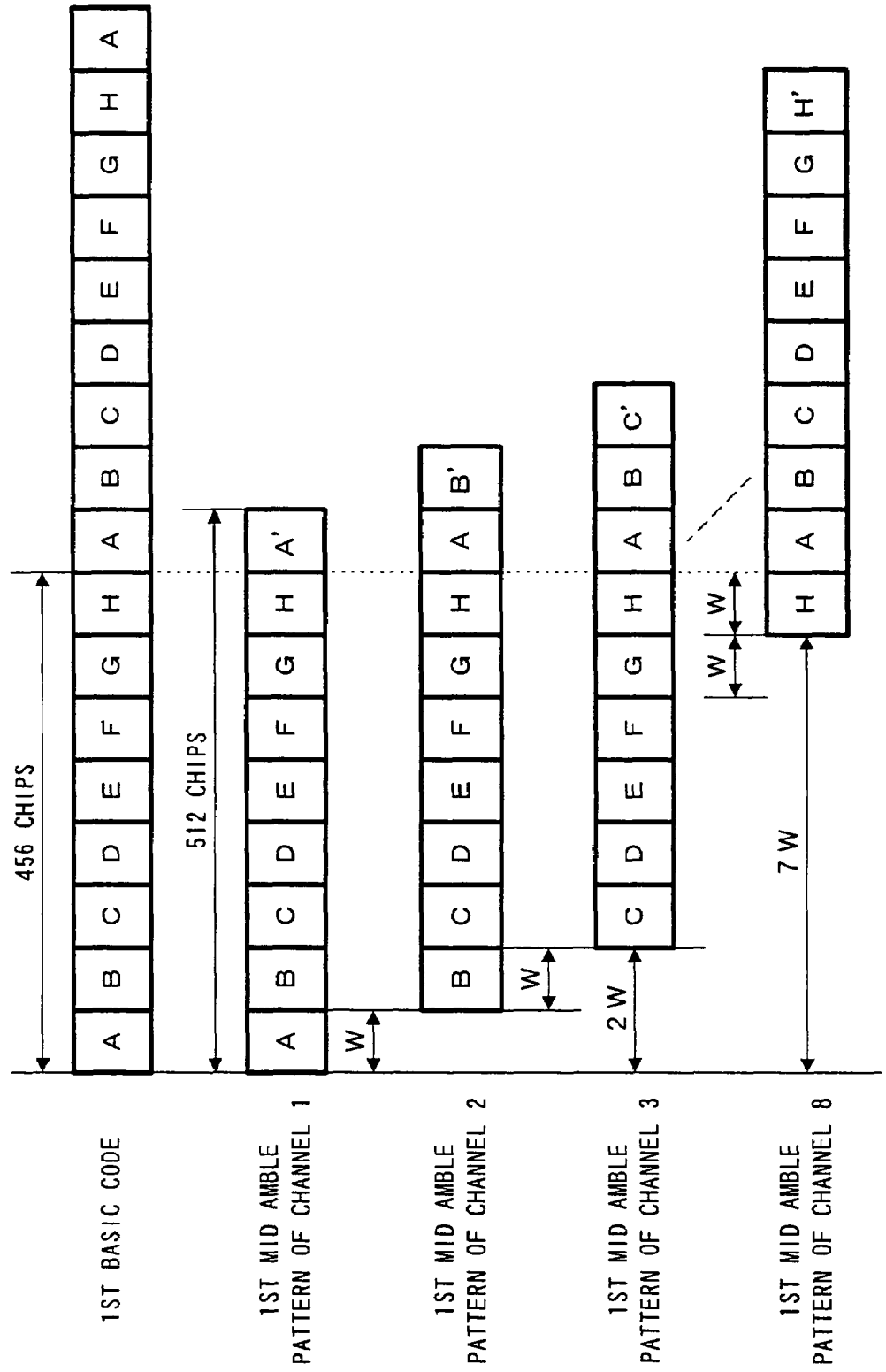
FIG. 7 is a schematic diagram showing a procedure for creating a 1st mid amble pattern used by the communication apparatus according to Embodiment 1 of the present invention.

FIG. 7 is a schematic diagram showing a procedure for creating the 1st mid amble pattern used by the communication apparatus according to Embodiment 1 of the present invention. As shown in FIG. 7, the 1st mid amble pattern used for each channel is created according to the procedure shown below using the 1st basic code (1st reference code), which cycles in a 456-chip cycle. This 1st basic code is known to the receiver shown in FIG. 6 and contains blocks A to H having mutually different codes of a W (=57) chip length.

First, as a 1st step, a reference position is determined in the above basic code and the reference position determined is sequentially shifted for each channel by $\{W \times (n-1)\}$ chips to the right in the figure. Here, W=57 chips and n is the number of channels. The number of chips shifted is 0, W, 2 W and 7 W for channel 1, channel 2, channel 3 and channel 8, respectively. The direction in which the reference position is shifted can also be the left direction in the figure.

As a 2nd step, a code of a predetermined length is extracted from the shifted reference position in the above basic code for each channel. This will result in each extracted code having a length of 456 chips as a whole. Here, suppose the above predetermined length is 456 chips as an example.

As a 3rd step, each code with 456 chips in length as a whole is converted to a code with 512 chips in length by adding at the end a code whose last 1 chip of the 1st block is removed and this code is used as the 1st mid amble pattern of each channel. That is, for example, for channel 1, a 1st mid amble pattern "ABCDEFGHA'" of channel 1 is created by adding at the end, that is, after block H, code A' which is first block A with the last 1 chip removed in the code which has a length of 456 chips as a whole.

Next, the procedure for creating the 2nd mid amble pattern will be explained with reference to FIG. 8. FIG. 8 is a schematic diagram showing a procedure for creating the 2nd mid amble pattern used by the CDMA communication apparatus according to one embodiment of the present invention. As shown in FIG. 8, the 2nd mid amble pattern used for each channel is created according to the procedure shown below using the 2nd basic code (2nd reference code), which cycles in a 456 chip cycle. This 2nd basic code is known to the receiver shown in FIG. 6 and contains 8 blocks J to Q having mutually different codes of a W (=57) chip length.

First, as a 1st step, a reference position is determined in the above basic code and the reference position determined is sequentially shifted for each channel by {W×(n−1)} chips in the left direction in figure (direction opposite when the 1st mid amble is created). Here, W=57 chips and n is the number of channels. The number of chips shifted is 0, W, 2 W and 7 W for channel 1, channel 2, channel 3 and channel 8, respectively. The direction in which the reference position is shifted can be any direction if only it is opposite to the direction in which the reference position is shifted when the 1st mid amble pattern is created.

As a 2nd step, a code of a predetermined length is extracted from the shifted reference position in the above basic code for each channel. This will result in each extracted code having a length of 456 chips as a whole. Here, suppose the above predetermined length is the same as the predetermined length when the 1st mid amble pattern is created.

As a 3rd step, each code with 456 chips in length as a whole is converted to a code with 512 chips in length as a whole by adding at the end a code whose last 1 chip of the 1st block is removed and this code is used as the 2nd mid amble pattern of each channel. That is, for example, for channel 1, a 2nd mid amble pattern "QJKLMNOPQ'" of channel 1 is created by adding at the end, that is, after block P, code Q' which is first block Q with the last 1 chip removed in the code which has a length of 456 chips as a whole.

Figure 9:
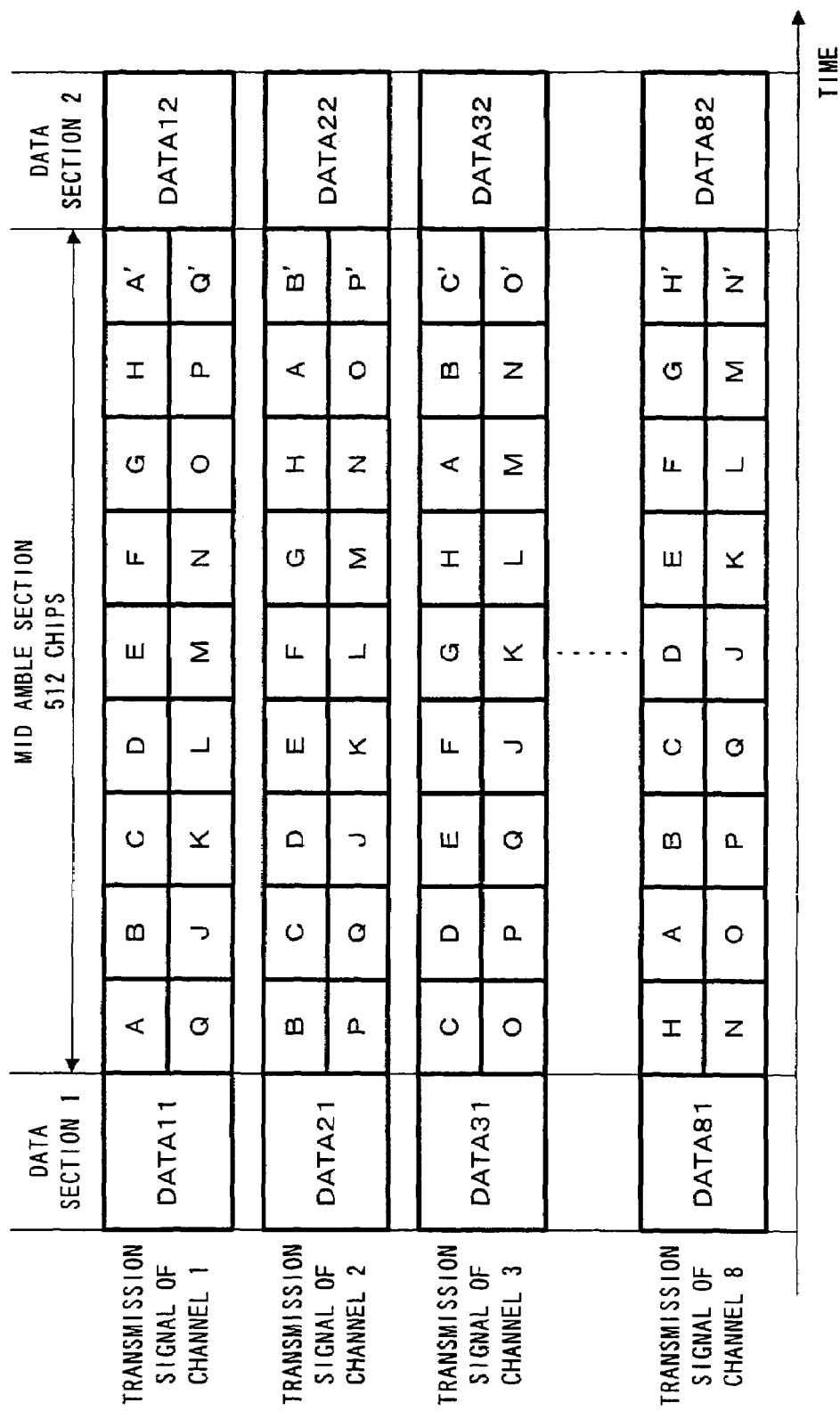
FIG. 9 is a schematic diagram showing transmission timing of the transmitter equipped with the communication apparatus according to Embodiment 1 above.

Next, the communication apparatus with the above configuration will be explained. First, the operation of the transmitter equipped with the communication apparatus with the above configuration will be explained with reference to FIG. 5 and FIG. 9. FIG. 9 is a schematic diagram showing the transmission timing of the transmitter in the communication apparatus according to Embodiment 1 of the present invention.

As shown in FIG. 5, the transmission data is subjected to spreading processing by spreading section 501 using a spreading code assigned to the transmission channel of this transmitter. The transmission data after spreading processing is sent to time multiplexing section 502.

Also, of the mid amble patterns created according to the above procedure, the 1st mid amble pattern and the 2nd mid amble pattern assigned to the transmission channel of this transmitter are sent to time multiplexing section 502.

In time multiplexing section 502, a transmission signal is created by multiplexing the transmission data after spreading processing, the 1st mid amble pattern and the 2nd mid amble pattern on frames. That is, a transmission signal is created by multiplexing the transmission data after spreading processing on the data section (here, data section 1 and data section 2) in the frames shown in FIG. 9 and by multiplexing the 1st mid amble pattern and the 2nd mid amble pattern on the mid amble section (512-chip section) in the above frames. Here, in the mid amble section, the 1st mid amble pattern and the 2nd mid amble pattern are multiplexed on a same time scale.

The transmission signal created by time multiplexing section 502 is subjected to predetermined transmission processing such as the frequency conversion by radio section 503 and then transmitted through antenna 504.

Next, the operation of the receiver equipped with the communication apparatus with the above configuration will be explained with reference to FIG. 6. The signal received through antenna 601 is subjected to predetermined reception processing such as the frequency conversion by reception section 602. The reception signal after the above processing is sent to separation section 603 and storage section 607. In storage section 607, the reception signal after the above processing is stored.

In separation section 603, the 512-chip signal received after the reference time of the reception signal subjected to the above processing is separated and of the separated 512-chip signal only 456 chips are cut from the last part. As described above, when there is no propagation delay, the reference time corresponds to the time during which the first part of each mid amble section in the signal transmitted by each transmitter (each mobile station) is received by the receiver (base station).

Correlation sections 604 and 605 carry out correlation value calculation processing using a signal with a length of 456 chips sent from separation section 603. That is, correlation sections 604 and 605 calculate a value of correlation between the above 456-chip reception signal and the 1st basic code and a value of correlation between the above 456-chip reception signal and the 2nd basic code.

More specifically, correlation section 604 uses the 1st basic code shown in FIG. 7 as the reference, multiplies the above 456-chip signal by the above 1st basic code while shifting the phase of the above 456-chip signal one chip at a time and calculates correlation values in their respective phases. In the same way, correlation section 605 calculates a correlation value using the 2nd basic code shown in FIG. 8.

Moreover, correlation sections 604 and 605 create delay profiles using their respective correlation values calculated as described above. Details of the delay profiles created will be described later. The delay profiles created are output to comparison/channel estimation section 606.

Comparison/channel estimation section 606 carries out channel estimation about each channel using each delay profile created by correlation sections 604 and 605. That is, the path of each channel and delay propagation of this path are detected using the above delay profiles. The channel estimation result is output to correlation sections 608 to 610.

The correlation sections 608 to 610 perform despreading processing on the reception signal sent from storage section 607 based on the channel estimation result by comparison/channel estimation section 606. That is, the reception signal sent from storage section 607 is subjected to despreading processing at timing taking account of the delay times of three paths estimated by comparison/channel estimation section 606. This embodiment describes a case where three correlation sections 608 to 610 perform despreading as an example, but there is not limit to the number of correlation sections.

Coherent detection sections 611 to 613 perform coherent detection on the signals despread by correlation sections 608 to 610, respectively. The signals subjected to coherent detection are combined by combination section 614 and thereby a demodulated signal is obtained.

Next, the channel estimation method by the comparison/channel estimation section in the transmitter equipped with the communication apparatus with the above configuration will be explained. Here, for convenience of explanation, suppose the total of the propagation delay and the delay dispersion is equal to or shorter than the W chip length and no delay wave exists in the signal from each channel.

Comparison/channel estimation section 606 performs channel estimation for each channel using delay profiles created by correlation sections 604 and 605. Here, the delay profiles created by correlation sections 604 and 605 are explained with reference to FIG. 10A and FIG. 10B.

Figure 10A:
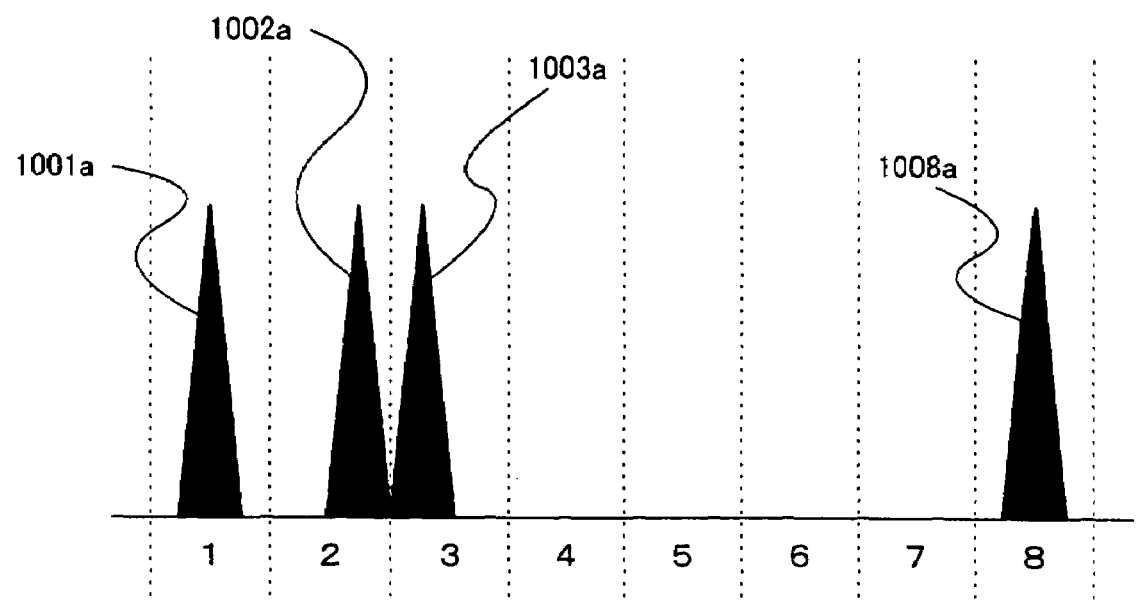
FIG. 10A illustrates an example of a delay profile created by correlation section 604 in the receiver equipped with the communication apparatus according to Embodiment 1 above.
Figure 10B:
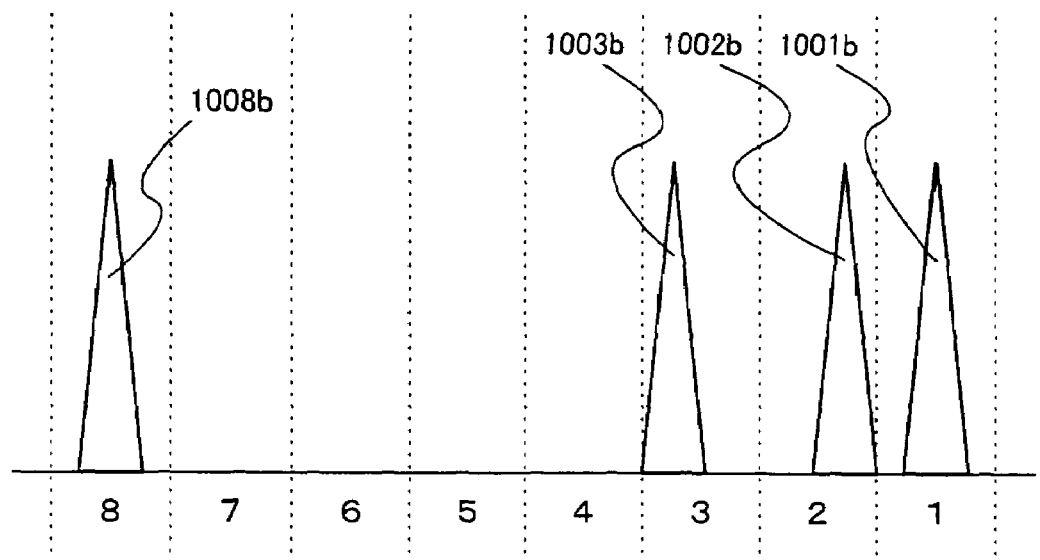
FIG. 10B illustrates an example of a delay profile created by correlation section 605 in the receiver equipped with the communication apparatus according to Embodiment 1 above.

FIG. 10A illustrates an example of a delay profile created by correlation section 604 of the receiver equipped with the communication apparatus according to Embodiment 1 of the implementation of the present invention and FIG. 10B illustrates an example of a delay profile created by correlation section 605 of the receiver equipped with the communication apparatus according to Embodiment 1 of the implementation of the present invention.

As shown in FIG. 10A, during correlation value calculation processing by correlation section 604, the correlation value reaches a maximum when the code in the mid amble section from one of the mobile stations contained in the 456-chip signal from separation section 603 matches the above known 1st basic code and a path of a certain size appears.

Therefore, for example, in FIG. 10A, the times at which the values of path 1001a, path 1002a, path 1003a and path 1008a reach their maximum values correspond to the times at which the 1st mid amble patterns of their respective mid amble sections contained in the above 456-chip signal from the mobile station 1, mobile station 2, mobile station 3 and mobile station 8 match the above known 1st basic codes.

In the same way, as shown in FIG. 10B, the correlation value reaches a maximum and a path of a certain size appears during correlation value calculation processing by correlation section 605 when the code of the mid amble section from one of the mobile stations contained in the 456-chip signal from separation section 603 matches the above known 2nd basic code.

Therefore, for example, in FIG. 10B, the times at which the values of path 1001b, path 1002b, path 1003b and path 1008b reach their maximum values correspond to the times at which the 2nd mid amble patterns of their respective mid amble sections contained in the above 456-chip signal from the mobile station 1, mobile station 2, mobile station 3 and mobile station 8 match the above known 2nd basic codes.

Also, as described above, when the total of propagation delay and the delay dispersion of each mobile station is smaller than a W (=57) chip length, the section where the path of a certain size on the delay profile appears is determined for each mobile station. That is, in the above case, the paths corresponding to mobile stations 1 to 8 appear in W-chip sections 1 to 8 (delay profile width) in delay profiles shown in FIG. 10A and FIG. 10B.

The W chip section of each mobile station in FIG. 10A has a reverse positional relationship with respect to the W chip section of each mobile station in FIG. 10B. This is because the method of creating the 1st mid amble pattern and the 2nd mid amble pattern corresponding to each mobile station, that is, the direction in which the reference position in the above 1st step is shifted is mutually opposite between the 1st mid amble pattern and the 2nd mid amble pattern.

Moreover, since correlation sections 604 and 605 carry out correlation value calculation processing using the 1st cyclic basic code and the 2nd cyclic basic code, respectively, the delay profiles shown in FIG. 10A and FIG. 10B are cyclic.

That is, W chip section 8 is placed immediately before W chip section 1 in FIG. 10A and W chip section 7 is placed immediately before this W chip section 8 and W chip sections 6, 5, 4 . . . are placed in the same way. Also, W chip sections 1, 2, 3 . . . are placed immediately after W chip section 8 in FIG. 10A. On the contrary, W chip section 1 is placed immediately before W chip section 8 in FIG. 10B and W chip section 2 is placed immediately before this W chip section 1 and W chip sections 3, 4, 5 . . . are placed in the same way. Also, W chip sections 8, 7, 6 . . . are placed immediately after chip section 1 in FIG. 10B.

Comparison/channel estimation section 606 carries out channel estimation using the above two delay profiles. Here, a case where channel estimation is performed for channel 1 (mobile station 1) will be explained as an example.

According to the transmission signal on channel 1 in FIG. 9 above, the 1st mid amble pattern and the 2nd mid amble pattern in the mid amble section are multiplexed on the same time axis. Therefore, the I component and Q component corresponding to paths of channel 1 in the delay profile shown in FIG. 10A are almost the same as the I component and Q component corresponding to paths of channel 1 in the delay profile shown in FIG. 10B. That is, the difference in the I component and Q component between the path of channel 1 in the delay profile shown in FIG. 10A and the path of channel 1 in the delay profile shown in FIG. 10B is within a predetermined error range.

For this reason, the size of the path of channel 1 in the delay profile shown in FIG. 10A and the size of the path of channel 1 in the delay profile shown in FIG. 10B are almost the same, and the propagation delay of channel 1 detected from the delay profile shown in FIG. 10A and the propagation delay of channel 1 detected from the delay profile shown in FIG. 10B are almost the same.

That is, in the delay profiles shown in FIG. 10A and FIG. 10B, the I component and Q component corresponding to path 1 are almost the same, and so the phase at which the value of path 1001a reaches a maximum and the phase at which the value of path 1001b reaches a maximum are almost the same, and the size of path 1001a and the size of path 1001b are almost the same. In other words, any two paths whose differences in the I component and Q component are beyond a predetermined error range, that is, any two paths whose differences in the path phase and size are beyond a predetermined error range can be considered not to be paths of the same channel.

Figure 11A:
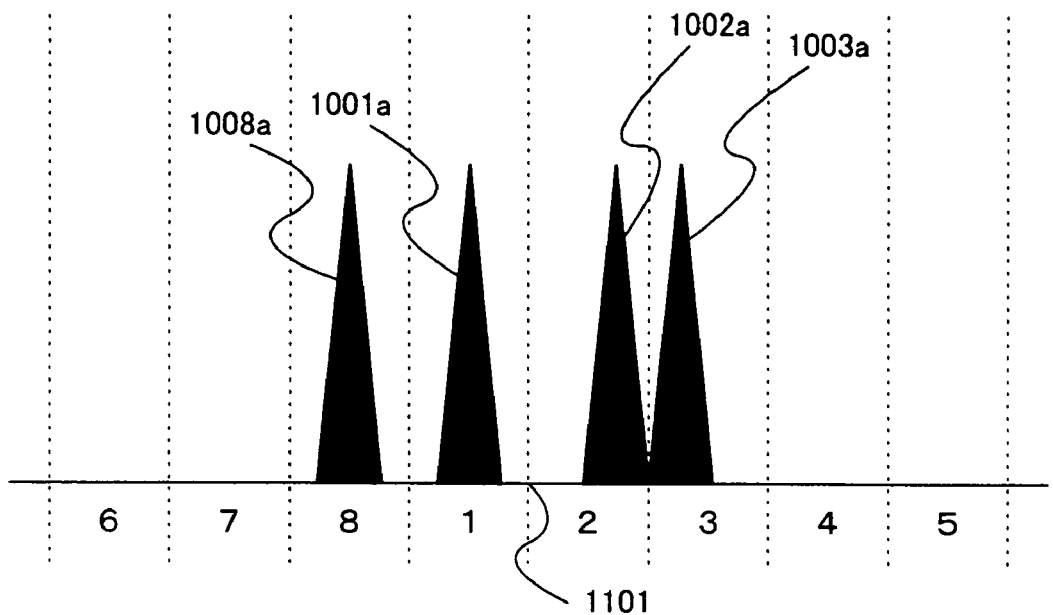
FIG. 11A illustrates an example of a delay profile after cycling created by correlation section 604 in the receiver equipped with the communication apparatus according to Embodiment 1 above.

Thus, comparison/channel estimation section 606 cycles the above two delay profiles using the W chip section of channel 1 as the reference. As a result, the delay profile by the 1st basic code shown in FIG. 10A is cycled as shown in FIG. 11A. The delay profile by the 2nd basic code shown in FIG. 10B is cycled as shown in FIG. 11B.

Figure 11B:
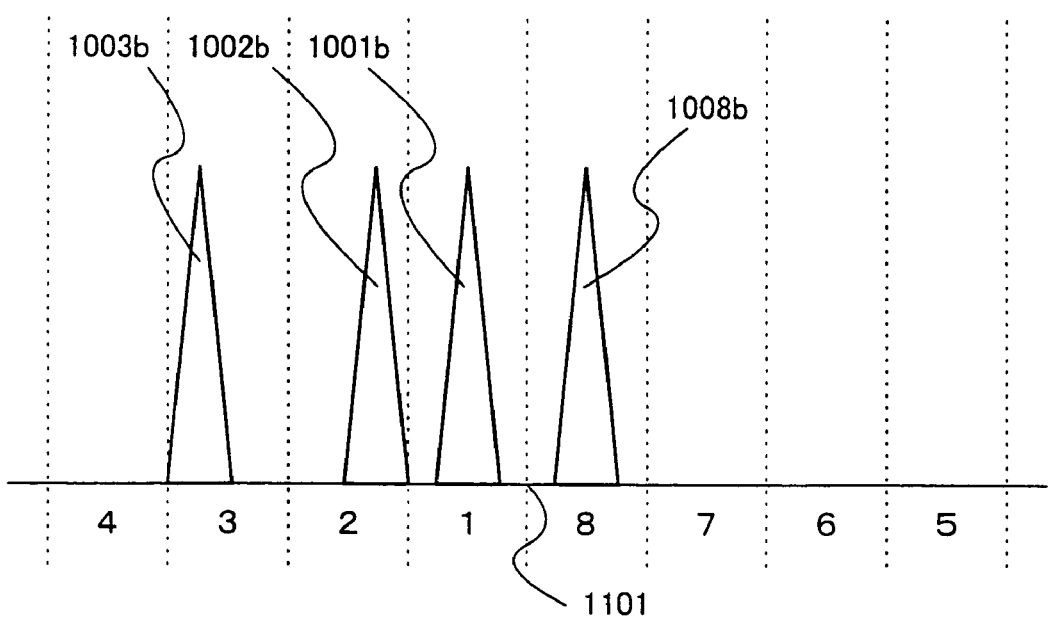
FIG. 11B illustrates an example of a delay profile after cycling created by correlation section 605 in the receiver equipped with the communication apparatus according to Embodiment 1 above.
Figure 12:
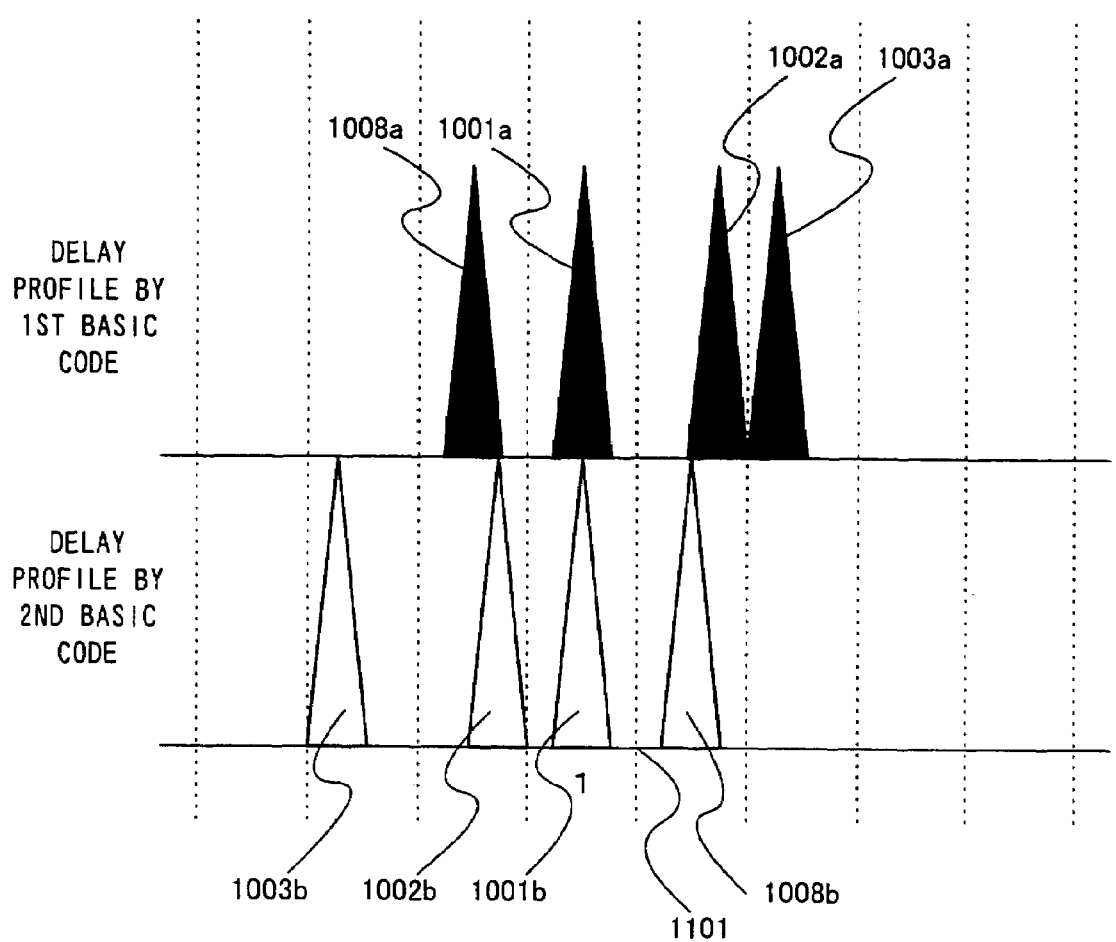
FIG. 12 illustrates a situation in which a delay profile after position adjustment created by each correlation section in the receiver equipped with the communication apparatus according to Embodiment 1 above.

Then, the delay profiles are compared after adjusting the positions of the delay profiles after the cycling shown in FIG. 11A and FIG. 11B so that their W chip sections of channel 1 match, that is, their phases (reference phases) 1101 at which the size of the path of a desired wave (main wave) when there is no delay in channel 1 reaches a maximum match. FIG. 12 shows delay profiles after the position adjustment.

More specifically, as a result of a comparison between delay profiles after the position adjustment as shown in FIG. 12, if matching paths are found, that is, if there are two paths whose differences in the phase and size are within a predetermined error range, those paths are used as the paths for channel 1. In this way, the propagation delay of channel 1 is detected. Here, the above predetermined error range can be set according to various conditions as appropriate.

By the way, if the total of propagation delay and delay dispersion is longer than the W chip length, in the delay profiles shown in FIG. 10A and FIG. 10B, for example, the path of channel 1 appears in the W chip section of another channel, not the W chip section of channel 1. This makes it difficult to detect the path of channel according to the conventional method.

However, in this embodiment, as described above, the 1st mid amble pattern and 2nd mid amble pattern of the mid amble section in a transmission signal are multiplexed on the same time axis, and therefore in the delay profiles created by correlation value calculation processing on this transmission signal and two basic codes, the I component and Q component corresponding to each channel are almost the same. That is, the size of the path of each channel and phase difference are almost the same.

Moreover, when the 1st mid amble pattern and 2nd mid amble pattern are each created, the direction in which the reference position is shifted in the 1st step is mutually opposite. Thus, as is clear from each delay profile (for example, FIG. 10) created by the above correlation value calculation processing, the W chip section of the channel adjacent to the W chip section of a channel is mutually opposite between the delay profiles.

For example, if attention is focused on the W chip section of channel 3, in the delay profile of FIG. 10A, the W chip section of channel 4 is located to the right and the W chip section of channel 2 is located to the left. On the contrary, in the delay profile of FIG. 10B, the W chip section of channel 2 is located to the right and the W chip section of channel 4 is located to the left.

Thus, in these delay profiles, it can be said that the path size and phase of one channel hardly match the path size and phase of another channel completely. In other words, in these delay profiles, paths with almost the same size and phase are likely to be paths of the same channel.

Figure 13:
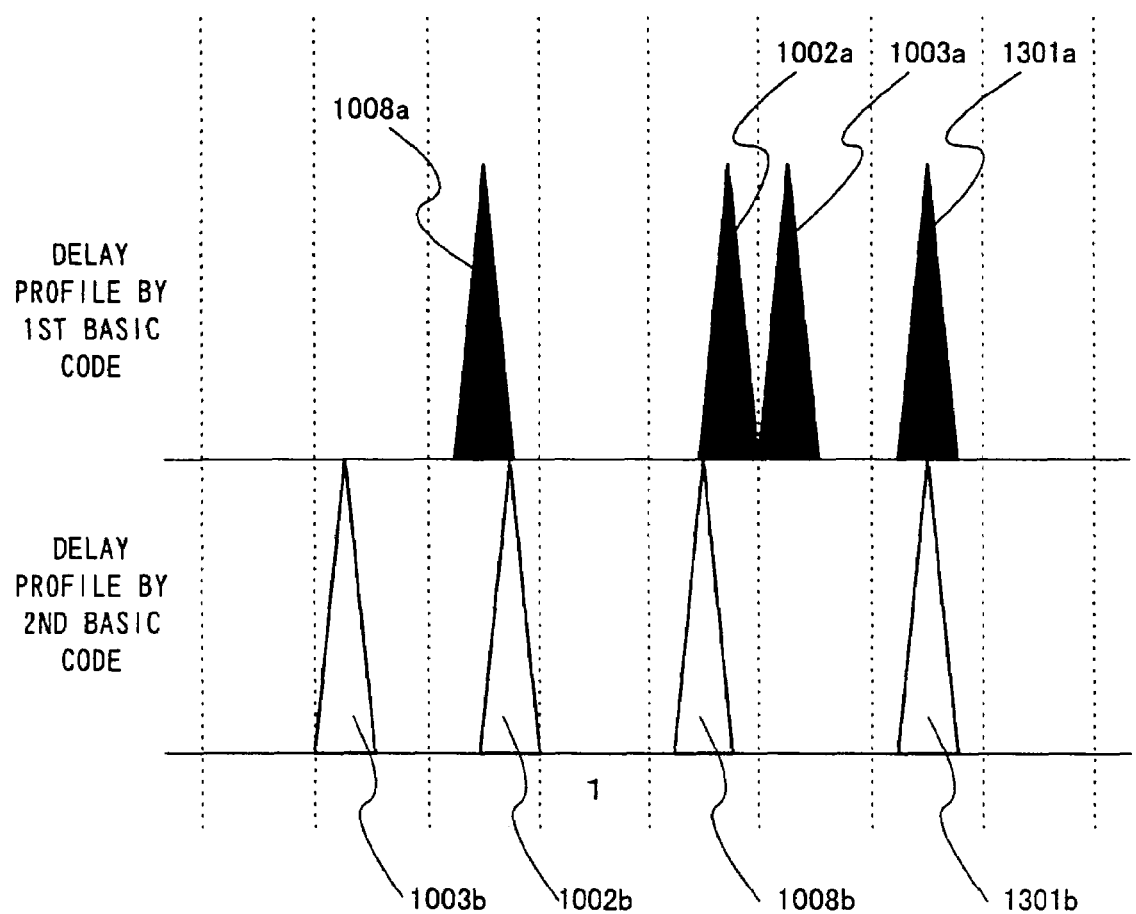
FIG. 13 illustrates a situation in which a delay profile (with a large propagation delay) after position adjustment created by each correlation section in the receiver equipped with the communication apparatus according to Embodiment 1 above.

Therefore, it is also possible to carry out channel estimation of each channel using the above method even in the case where the total of propagation delay and delay dispersion is greater than the W chip length. For example, as shown in FIG. 13, if the delay propagation of a signal from channel 1 is longer than the W chip length, the path of channel 1 does not appear in the W chip section of channel 1 in the two delay profiles. Here, for the reason described above, quasi matching paths, that is, paths whose difference in size and phase is within a predetermined error range, can be recognized as paths of the same channel. In FIG. 13, path 1301a and path 1301b have almost the same size and phase, and therefore this path 1301a (path 1301b) is detected as the path of channel 1.

Figure 14:
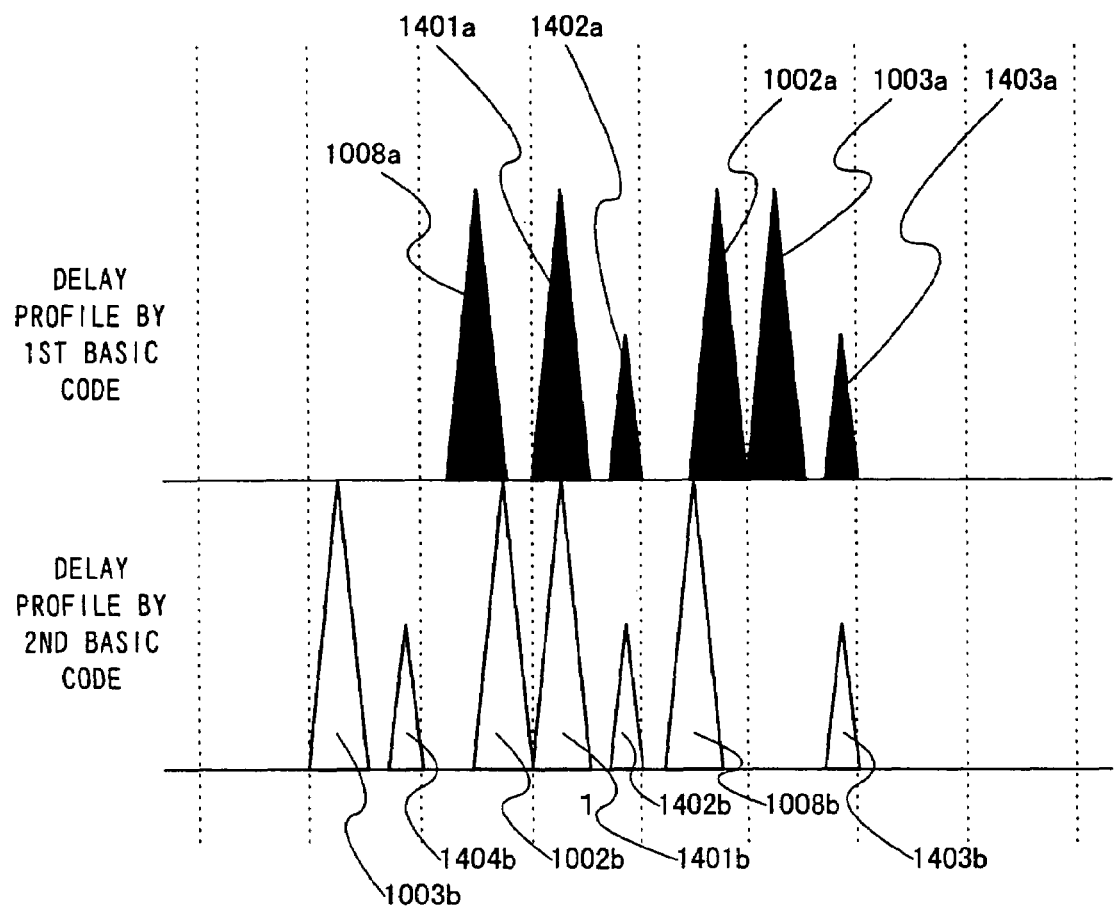
FIG. 14 illustrates a situation in which a delay profile (when a delay wave exists) after position adjustment created by each correlation section in the receiver equipped with the communication apparatus according to Embodiment 1 above.

The explanation above describes the case where the receiver equipped with the communication apparatus according to this embodiment only receives a desired wave of each channel, but the above receiver is applicable not only when a desired wave (main wave) is received but also when a delay wave is received. An example of two delay profiles in this case is shown in FIG. 14.

As described above, since the 1st mid amble pattern and 2nd mid amble pattern of the mid amble section of the transmission signal are multiplexed on the same time axis, the delay profiles created by correlation value calculation processing between this transmission signal and two basic codes are almost identical in the I component and Q component corresponding to the path of delay wave of each channel. That is, these delay profiles are also almost identical in the size of path of the delay wave of each channel and phase difference.

Therefore, according to the channel estimation method above, the path of not only a desired wave but also a delay wave can be detected for each channel. That is, in the delay profiles whose position has been adjusted so that the W chip sections of channel 1 shown in FIG. 14 match, path 1401a and path 1401b, 1402a and path 1402b, and 1403a and path 1403b are almost identical in their size and phase difference. From this, it is clear that these paths are the paths that correspond to channel 1.

More specifically, from the path size, it is assumed that path 1401a (path 1401b) is the path of the desired wave of channel 1, and path 1402a (path 1402b) and path 1403a (path 1403b) are the paths of the delay wave of channel 1. Regarding path 1404b, there is no equivalent in size and phase in the delay profile by the 1st basic code, and therefore path 1404b is assumed to be the path of a delay wave of a channel other than channel 1.

Hereafter, the propagation delays of these three detected paths are sent to correlation sections 608 to 610 shown in FIG. 6. This allows correlation sections 608 to 610 to perform despreading processing on the reception signals at timing taking account of their respective propagation delays.

As shown above, this embodiment creates the 1st mid amble pattern and 2nd mid amble pattern specific to each channel using the 1st cyclic basic code and 2nd basic code. These 1st mid amble pattern and 2nd mid amble pattern are created so that they have an inverse positional relationship of the W chip section in each delay profile created by the apparatus on the receiving side.

The apparatus on the transmitting side transmits a signal on which the above 2 mid amble patterns of the mid amble section are multiplexed on the same time axis and the apparatus on the receiving side compares the size and phase of paths in delay profiles created by correlation value calculation processing between the above 1st basic code and 2nd basic code using the reception signal, and in this way it is possible to perform correct channel estimation of each channel even if a delay propagation is greater than the W chip length or a delay wave exists. This allows correct detection of a propagation delay of each channel without affecting the transmission capacity and the number of channels accommodated.

This embodiment describes the case where the 1st mid amble pattern and 2nd mid amble pattern are created according to the aforementioned method as an example, but the present invention is not limited to this, and is also applicable to cases where the number of chips by which a reference position is shifted in the aforementioned step, direction of shifting and the total number of channels, etc. are changed as appropriate.

That is, it is necessary to create the above mid amble patterns so that W chip sections adjacent to the W chip section of each channel do not coincide with the W chip sections of the same channel in two delay profiles. More specifically, it is necessary to make sure that the positional relationship (phase difference) between the W chip section of a channel and the W chip section of another channel differs between two delay profiles.

This can be done by creating the 1st mid amble pattern and 2nd mid amble pattern assigned to each channel so that a predetermined channel to which the 1st mid amble pattern having a code of a predetermined length extracted from a point shifted by an arbitrary section from the 1st section of the 1st mid amble pattern is assigned is different from the channel to which the 2nd mid amble pattern having a code of a predetermined length extracted from a point shifted by an arbitrary section from the first block of the 2nd mid amble pattern is assigned.

Figure 8:
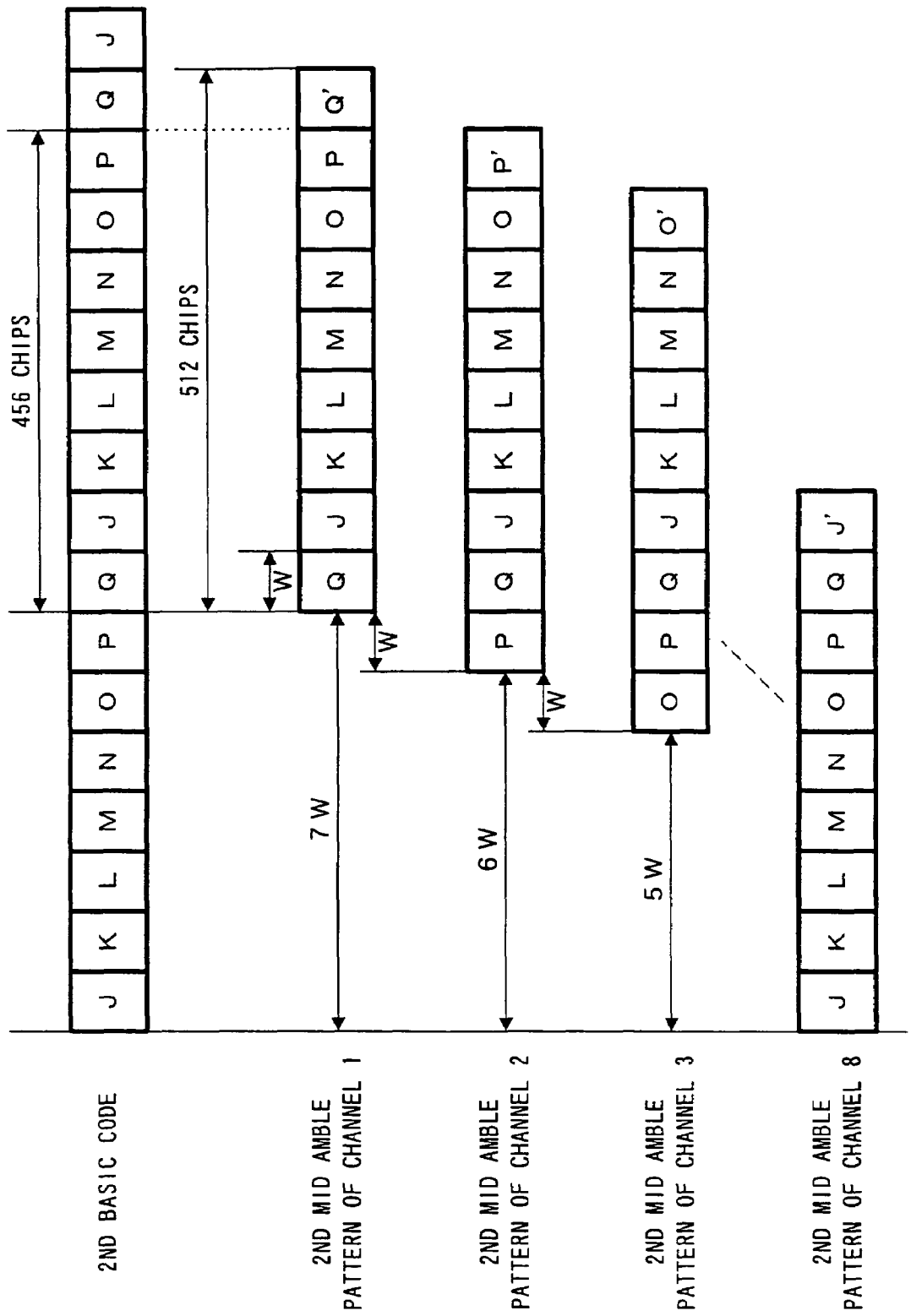
FIG. 8 is a schematic diagram showing a procedure for creating a 2nd mid amble pattern used by the communication apparatus according to Embodiment 1 of the present invention.

For example, in FIG. 7 and FIG. 8, the code of block B is obtained by extracting the W chip length from a point shifted by the W section from the first block of the 1st mid amble pattern assigned to channel 1. It is channel 2 that has the 1st mid amble pattern having this block B at the first block. Then, the code of block J is obtained by extracting the W chip length from a point shifted by the W section from the first block of the 2nd mid amble pattern assigned to channel 1. It is channel 8 that has the 2nd mid amble pattern having this block J at the end. In this manner, mid amble patterns can be created for all channels so that the 1st and 2nd mid amble patterns are assigned to different channels.

If mid amble patterns are assigned to their respective channels in such a way as to meet the above condition, when creating the above mid amble patterns, even if the reference position is shifted in the 1st step in the same direction for the 1st mid amble pattern and 2nd mid amble pattern, the mid amble patterns shown in FIG. 9 can be assigned to channels 1 to 8, as a consequence.

This embodiment also describes the case where in the above 1st step of creating mid amble patterns, the number of chips the reference position is shifted is W chips for all channels, but the present invention is not limited to this and is also applicable to a case where the number of chips the reference position is shifted is changed as appropriate. In this case, if the apparatus on the receiving side is allowed to recognize the number of chips the reference position is shifted for each channel, it is possible to accurately detect delay propagations for each channel as in the case of the above example.

Furthermore, this embodiment describes the case where two mid amble patterns, the 1st mid amble pattern and 2nd mid amble pattern, are used, but the present invention is not limited to this and is also applicable to a case where there are three or more mid amble patterns. In this case, propagation delays of each channel can be detected more accurately.

As described above, according to the present invention, the apparatus on the transmitting side performs transmission by multiplexing (code-multiplexing) two mid amble patterns for one channel created using two types of cyclic codes in the mid amble section on the same time axis, and the apparatus on the receiving side creates two delay profiles by calculating a value of correlation between the reception signal and above two types of codes and furthermore detects quasi matching paths in the above delay profiles cycled so that the sections in which the path of the channel to be detected when there is no propagation delay match each other, thus providing a communication apparatus capable of accurately detecting propagation delays for each mobile station without affecting the transmission capacity and the number of channels accommodated.

Embodiment 2

Figure 15:
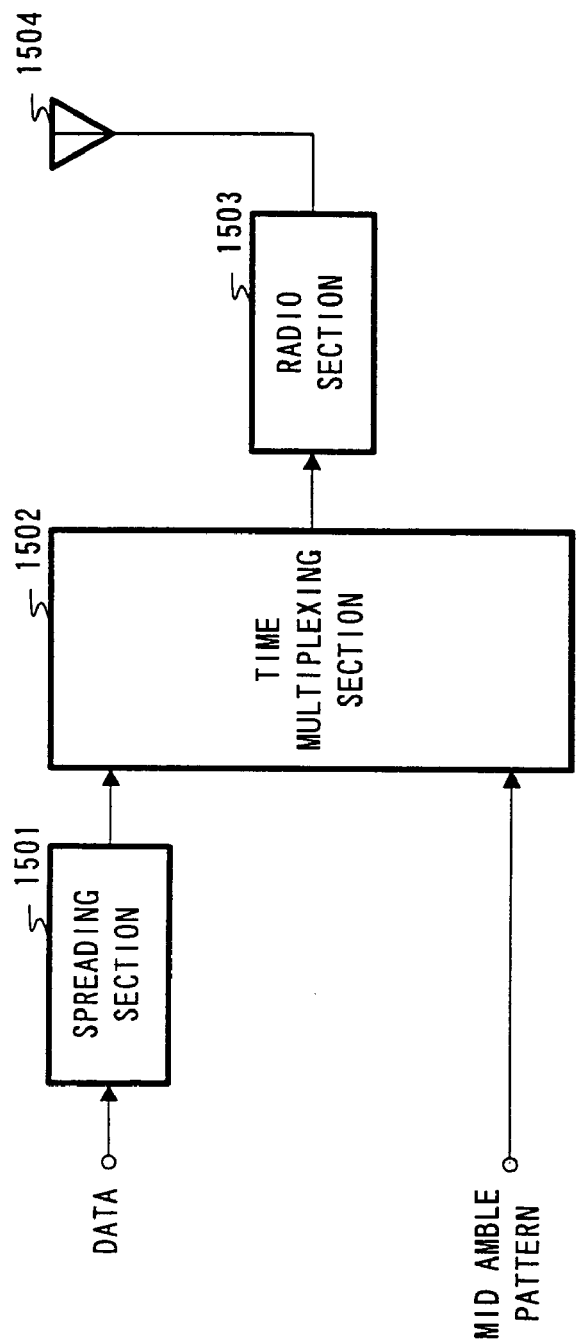
FIG. 15 is a block diagram showing a configuration of a transmitter equipped with a communication apparatus according to Embodiment 2 of the present invention.

FIG. 15 is a block diagram showing a configuration of a transmitter equipped with a communication apparatus according to Embodiment 2 of the present invention. In FIG. 15, spreading section 1501 carries out spreading processing on transmission data using a spreading code assigned to a transmission channel of this transmitter. Time multiplexing section 1502 creates a transmission signal by multiplexing a mid amble pattern and transmission data after spreading processing on frames. The mid amble pattern is a known signal used to create a delay profile on the other side of communication which receives a signal sent by this transmitter. The mid amble pattern input to time multiplexing section 1502 is assigned specific to each channel (each transmitter) and changes according to a predetermined pattern. Details of this mid amble pattern will be described later.

As the frame format, a format mainly including data section 1, a mid amble section and data section 2 is used as shown in FIG. 2. The mid amble section is a section into which a known signal for creation of a delay profile is inserted. This embodiment describes a case where a known signal for creation of a delay profile is inserted into the mid amble section in the frame format shown in FIG. 2, but the present invention is not limited to this and is also applicable to a case where a known signal for creation of a delay profile is inserted into any part of the frame format.

Radio section 1503 carries out predetermined transmission processing such as the frequency conversion on the transmission signal created by time multiplexing section 1502 and transmits the transmission signal after the above processing through antenna 1504.

Figure 16:
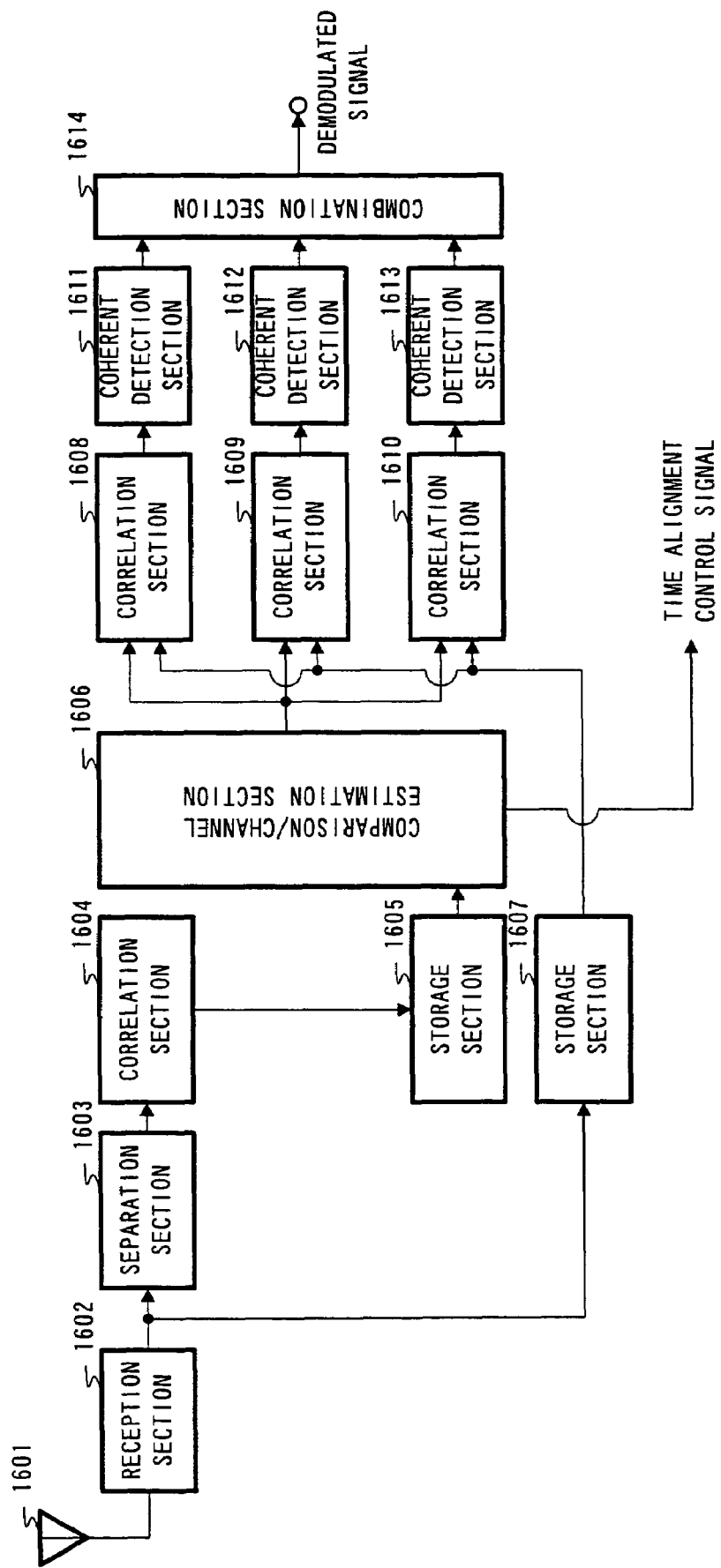
FIG. 16 is a block diagram showing a configuration of a receiver equipped with the communication apparatus according to Embodiment 2 above.

FIG. 16 is a block diagram showing a configuration of the receiver equipped with the communication apparatus according to Embodiment 2 of the present invention. In FIG. 16, reception section 1602 carries out predetermined reception processing such as frequency conversion on the signal (reception signal) received through antenna 1601 and sends the reception signal subjected to the above processing to separation section 1603 and storage section 1607. This reception signal is a signal on which signals transmitted by the a plurality of transmitters are multiplexed in a same frequency band. Also, the above plurality of transmitters each has the configuration shown in FIG. 15 and sends a signal to the receiver shown in FIG. 16 using different channels.

Storage section 1607 stores a reception signal after the above processing and outputs it to correlation section 1608 to 1610, which will be described later. Separation section 1603 separates a signal corresponding to 512 chips received from the reference time of the reception signal subjected to the above processing.

Correlation section 1604 creates a delay profile using the correlation value calculated after carrying out correlation value calculation processing using the separated reception signal for 512 chips and cyclic basic code assigned to each channel. Furthermore, correlation section 1604 sends information on the created delay profile to storage section 1605. The information on the delay profile sent by correlation section 1604 to storage section 1605 is, for example, a correlation value (I component and Q component) obtained through correlation value calculation processing and size of each path (power value), etc. Storage section 1605 stores the information on the delay profile from correlation section 1604.

Comparison/channel estimation section 1606 performs channel estimation for each channel using the information on the delay profile stored in storage section 1605. That is, comparison/channel estimation section 1606 detects the path for each channel and delay propagation of this path using the above information on the delay profile. Moreover, comparison/channel estimation section 1606 creates a time alignment control signal using the channel estimation result, that is, the detection result of propagation delay. This time alignment control signal will be described later.

Correlation sections 1608 to 1610 carry out despreading processing on a reception signal from storage section 1607 using a spreading code assigned to each channel based on the channel estimation result of comparison/channel estimation section 1606. Coherent detection sections 1611 to 1613 carry out coherent detection processing on the signal subjected to despreading processing by correlation sections 1608 to 1610, respectively. Combination section 1614 combines signals subjected to coherent detection processing by coherent detection sections 1611 to 1613 and outputs a demodulated signal.

FIG. 16 shows, as the example, a configuration with 3 lines of correlation sections and coherent detection sections to explain a case where three paths are handled for each channel, but the present invention is also applicable when the number of lines of correlation sections and coherent detection sections is changed as appropriate.

Next, the method of assigning the mid amble pattern (known reference code) to each channel will be explained. First, a method of creating mid amble patterns to be assigned to each channel will be explained with reference to FIG. 17. Here, as an example, suppose the total number of channels is 8.

Figure 17:
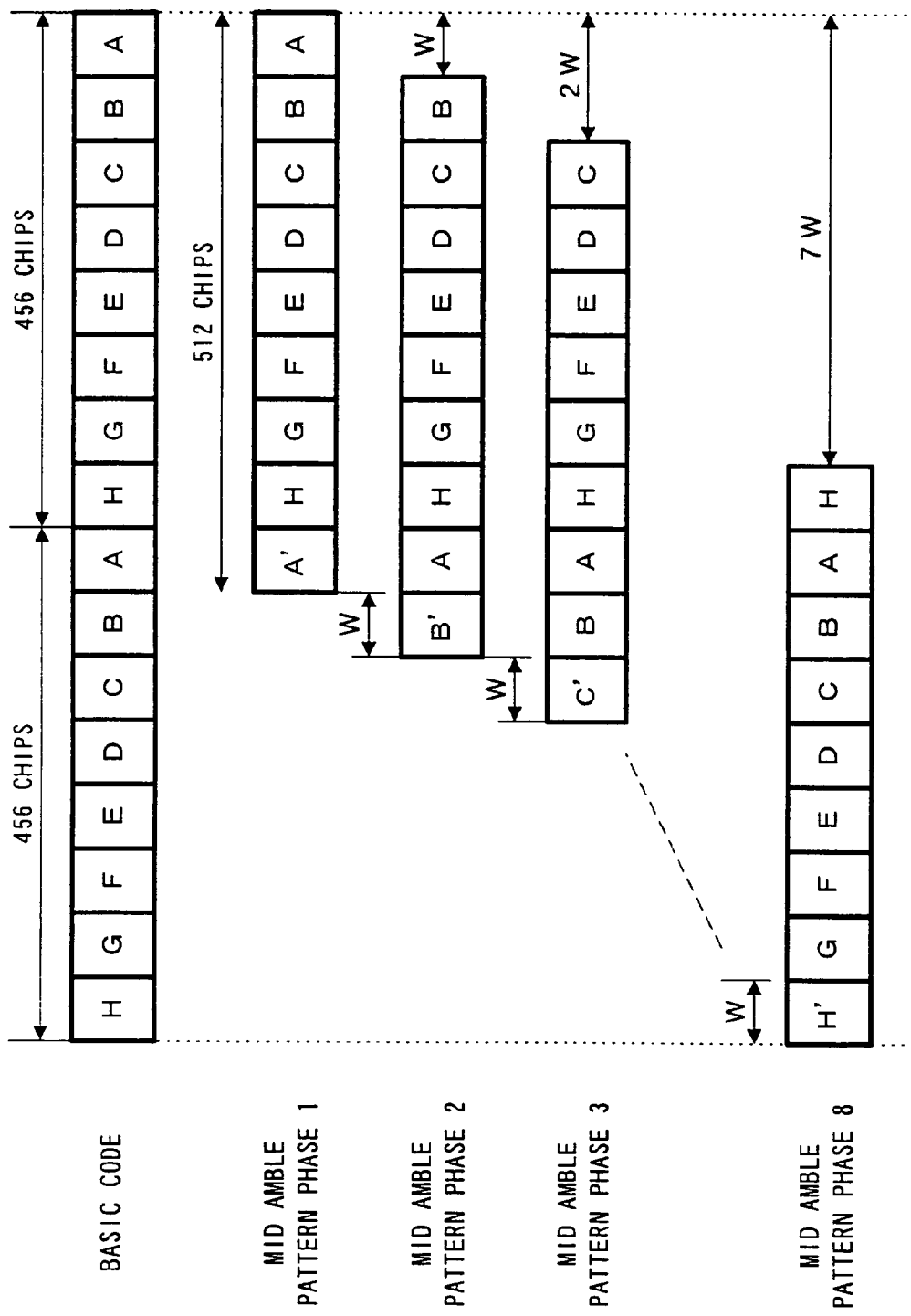
FIG. 17 is a schematic diagram showing a procedure for creating a mid amble pattern used by the communication apparatus according to Embodiment 2 above.

FIG. 17 is a schematic diagram showing a procedure for creating mid amble patterns used by the communication apparatus according to Embodiment 2 of the present invention. As shown in FIG. 17, a mid amble pattern used for each channel is created according to the procedure shown below using a basic code (reference code) which cycles in a 456-chip (=8 W) cycle. This basic code is known to the receiver shown in FIG. 16 and contains eight blocks A to H having mutually different codes of W (=57) chip length.

First, as a 1st step, a reference block is determined in the above basic code. Here, suppose the reference block is "A".

As a 2nd step, the phase (number of chips) of the reference block above is shifted by {W×(m−1)} to the left in the figure. Here, W=57 chips and m is the total number of channels. The direction in which the reference block is shifted can also be the right direction in the figure.

As a 3rd step, 513 chips are extracted from the start of each reference block whose phase is shifted in the 2nd step in the above basic code. In this way, a total of m (total number of channels) mid amble patterns each having a length of 513 chips are created as a whole. Furthermore, in each mid amble pattern of 513 chips in length, the first one chip or last one chip of the first block is removed. In this way, mid amble patterns each having a length of 512 chips are created by the number corresponding to the total number of channels. In FIG. 17, in each mid amble pattern of 512 chips in length, the first block corresponds to the last block with one chip removed.

FIG. 17 shows mid amble patterns created by shifting the phase by 0, W, 2 W and 7 W in the 2nd step of the eight mid amble patterns created.

To simplify explanations hereafter, suppose the mid amble patterns created by shifting the phase by 0, W, 2 W and 7 W in the 2nd step are referred to as "mid amble pattern of phase 1 to mid amble pattern of phase 8", respectively.

Then, the method of assigning the mid amble patterns created as shown above to each channel will be explained with reference to FIG. 18 and FIG. 19. FIG. 18 illustrates a 1st example of the method of assigning mid amble patterns to each channel in the communication apparatus according to Embodiment 2 of the present invention. FIG. 19 illustrates a 1st example showing how to apply the assignment method shown in FIG. 18 in the communication apparatus according to Embodiment 2 of the present invention.

In FIG. 18, as assignment patterns, for example two assignment patterns, assignment pattern 1 and assignment pattern 2, are prepared and mid amble patterns to be assigned to each channel are changed for every assignment pattern. That is, in assignment pattern 1, mid amble pattern of phase 8 to mid amble pattern of phase 1 are assigned to channel 1 (transmitter 1) to channel 8 (transmitter 8), respectively, and in assignment pattern 2, mid amble pattern of phase 1 to mid amble pattern of phase 8 are assigned to channel 1 (transmitter 1) to channel 8 (transmitter 8), respectively.

In FIG. 19, as the assignment pattern actually used, assignment pattern 1 and assignment pattern 2 above are used by alternating them every unit time. That is, at time [T−1], mid amble patterns are assigned to each channel according to assignment pattern 2 and at time [T+0], mid amble patterns are assigned to each channel according to assignment pattern 1, and mid amble patterns are assigned to each channel according to either one of the assignment patterns which are alternated every unit time, thereafter. This is how mid amble patterns are assigned to each channel.

Figure 20:
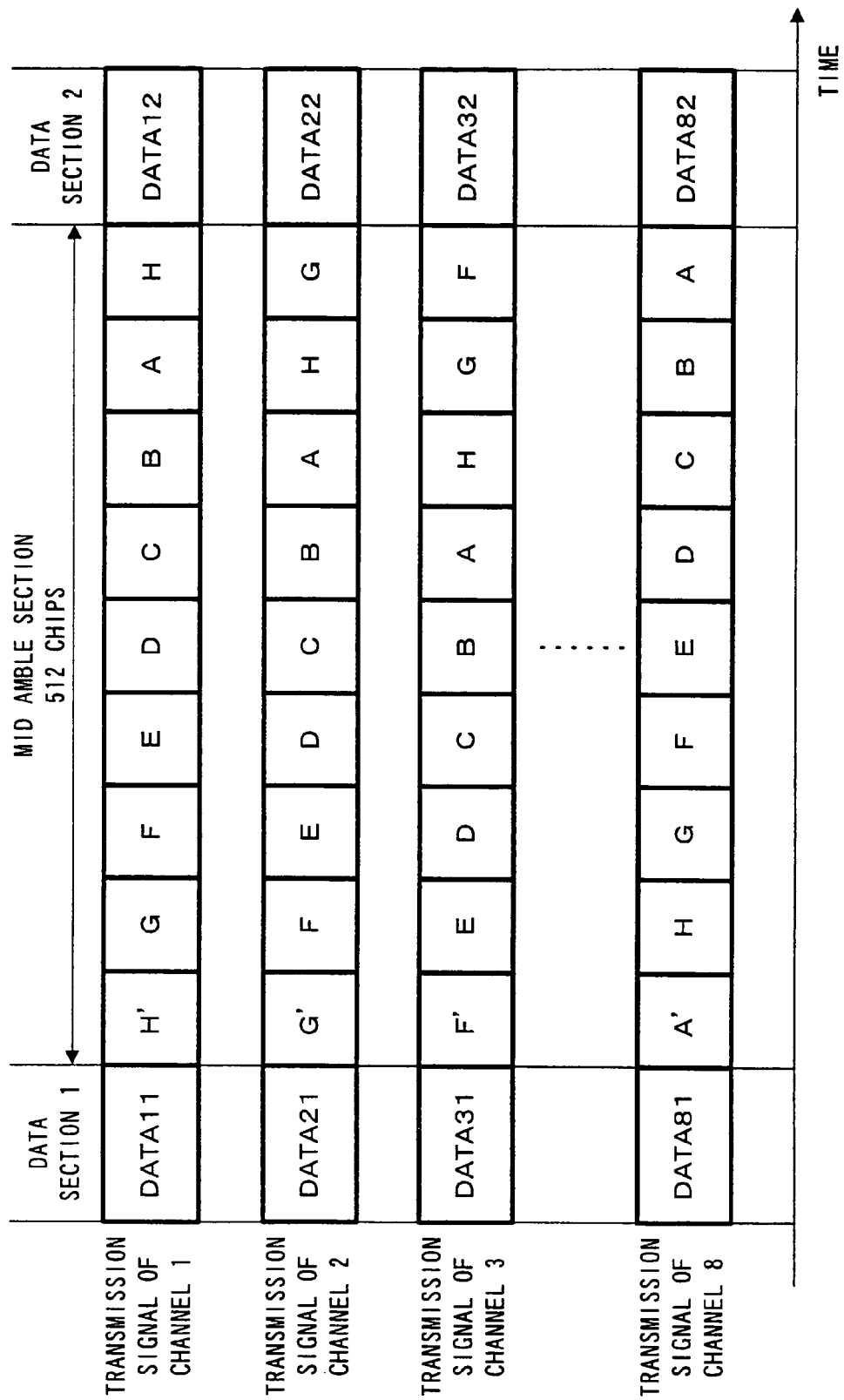
FIG. 20 is a schematic diagram showing transmission timing of the transmitter equipped with the communication apparatus according to Embodiment 2 above when assignment pattern 1 is applied.
Figure 21:
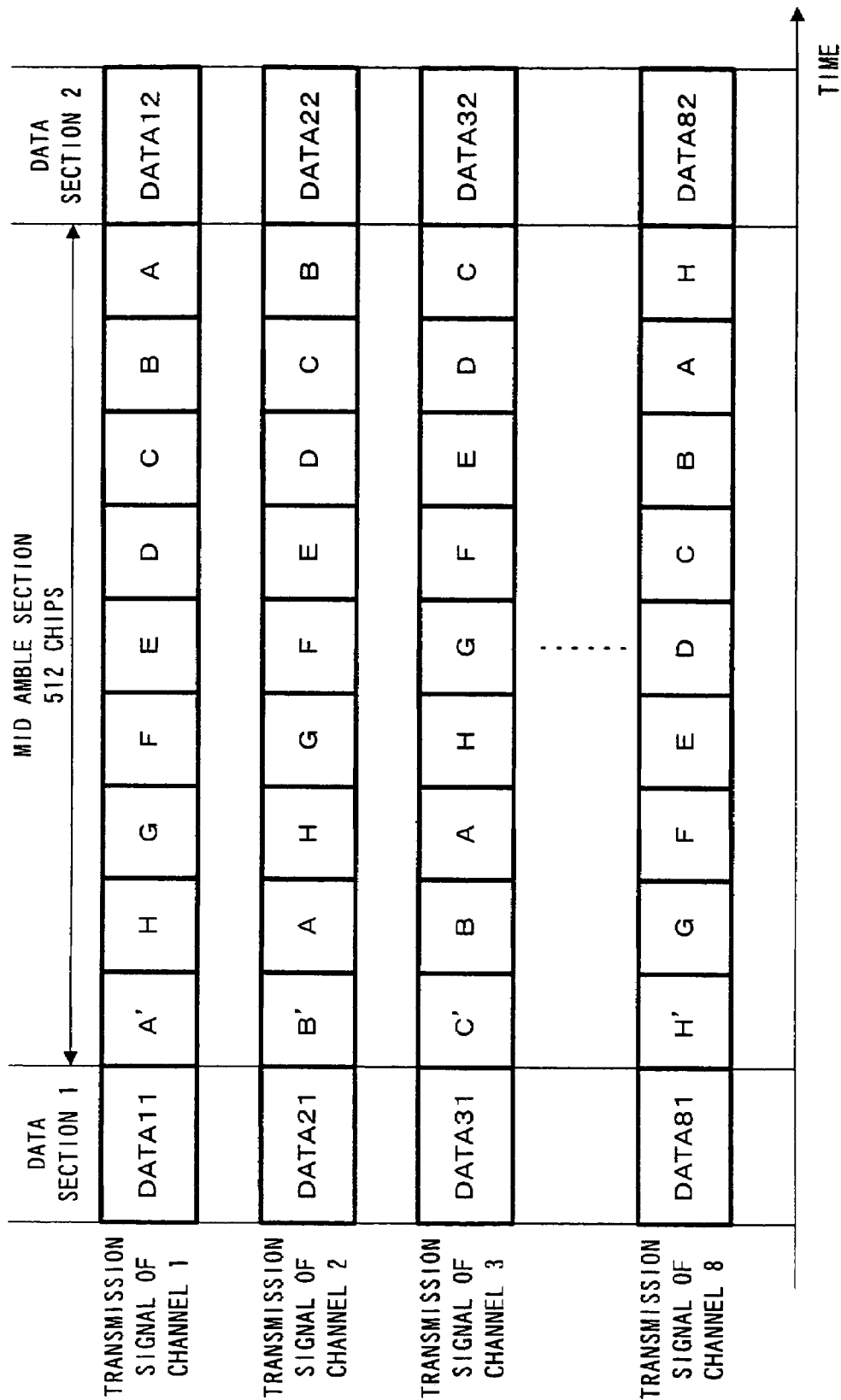
FIG. 21 is a schematic diagram showing transmission timing of the transmitter equipped with the communication apparatus according to Embodiment 2 above when assignment pattern 2 is applied.

Then, the operation of the communication apparatus with the above configuration will be explained. First, the operation of the communication apparatus equipped with the communication apparatus with the above configuration will be explained with reference to FIG. 20 and FIG. 21 in addition to FIG. 15. FIG. 20 is a schematic diagram showing the transmission timing of the communication apparatus according to Embodiment 2 of the present invention when assignment pattern 1 is applied. FIG. 21 is a schematic diagram showing the transmission timing of the transmitter equipped with the communication apparatus according to Embodiment 2 of the present invention when assignment pattern 2 is applied.

In FIG. 15, transmission data is subjected to spreading processing using a spreading code assigned to the transmission channel of the transmitter by spreading section 1501. The transmission data after the spreading processing is sent to time multiplexing section 1502.

Furthermore, the mid amble patterns assigned to the transmission channel of the transmitter are sent to time multiplexing section 1502.

Time multiplexing section 1502 creates a transmission signal by multiplexing the transmission data after the spreading processing and mid amble patterns on frames. That is, a transmission signal is created by inserting the transmission data after the spreading processing into data sections (here data sections 1 and 2) in the frames shown in FIG. 20 and FIG. 21 and inserting mid amble patterns into the mid amble sections in the above frames.

More specifically, when assignment pattern 1 is applied (for example, at time [T+0], time [T+2] and time [T+4], etc., in FIG. 19), a mid amble pattern of each channel inserted into the mid amble section is as shown in FIG. 20, and when assignment pattern 2 is applied (for example, at time [T−1], time [T+1] and time [T+3], etc., in FIG. 19), a mid amble pattern of each channel inserted into the mid amble section is as shown in FIG. 21. That is, two mid amble patterns are time-multiplexed on frames.

The transmission signal created by time multiplexing section 1502 is subjected to predetermined transmission processing such as frequency conversion and transmitted through antenna 1504.

Next, the operation of the receiver equipped with the communication apparatus with the above configuration will be explained with reference to FIG. 16. The signal received through antenna 1601 is subjected to predetermined reception processing such as the frequency conversion by reception section 1602. The reception signal after the above processing is sent to separation section 1603 and storage section 1607. In storage section 1607, the reception signal after the above processing is stored.

In separation section 1603, of the reception signal after the above processing, the 512-chip signal received from the reference time is separated and of the separated 512-chip signal, only 456 chips are cut from the last block. As described above, the reference time corresponds to the time when the start of each mid amble section in the signal transmitted by each transmitter (each mobile station) is received by this receiver when there is no propagation delay.

Correlation section 1604 carries out correlation value calculation processing using a 456-chip signal sent from separation section 1603. That is, correlation section 1604 calculates a value of correlation between the above 456-chip reception signal and cyclic basic code. Furthermore, correlation section 1604 creates a delay profile using the correlation value calculated above. Details of a delay profile created will be described later. The information on the created delay profile is sent to storage section 1605.

Storage section 1605 stores the information on the delay profile from correlation section 1604. More specifically, the information on the delay profile from correlation section 1604 is stored every unit time. As the unit time here, for example, the time required for reception of a unit frame can be used. This allows storage section 1605 to store the information on the delay profile corresponding to a mid amble pattern changed every unit time by the transmitter shown in FIG. 15. That is, for example, storage section 1605 can store the information on the delay profile created by correlation section 1604 using the transmission signal sent by the above transmitter at time [T−1] and the information on the delay profile created by correlation section 1604 using the transmission signal sent by the above transmitter at time [T+0].

Furthermore, storage section 1605 sends information on a delay profile every unit time to comparison/channel estimation section 1606. Comparison/channel estimation section 1606 carries out channel estimation using information on a delay profile every unit time and thereby detects the path of each channel and propagation delay of this path. The specific channel estimation method will be described later. The channel estimation result is output to correlation sections 1608 to 1610.

Correlation sections 1608 to 1610 carries out despreading processing on the reception signal sent from storage section 1605 based on the channel estimation result of comparison/channel estimation section 1606. That is, the reception signal sent from storage section 1607 is subjected to despreading processing by correlation sections 1608 to 1610 for each channel at timing taking account of delay times of three paths estimated by comparison/channel estimation section 1606. This embodiment describes the case where three correlation sections 1608 to 1610 perform despreading, but there is no limit to the number of correlation sections.

Coherent detection sections 1611 to 1613 carry out coherent detection processing on the signals subjected to despreading processing by correlation sections 1608 to 1610, respectively. Combination section 1614 combines the signals subjected to coherent detection processing and thereby a demodulated signal is obtained.

Next, the channel estimation method by the comparison/channel estimation section in the transmitter equipped with the communication apparatus with the above configuration will be explained. For convenience of explanation, suppose the total of delay propagation and delay dispersion is equal to or smaller than a W chip length and no delay wave exists in the signal from each channel in the following explanation.

Comparison/channel estimation section 1606 carries out channel estimation about each channel using information on a delay profile for every unit time stored in storage section 1605. Here, a delay profile, which is created when assignment pattern 1 is applied or when assignment pattern 2 is applied will be explained with reference to FIG. 22 first. Description "When assignment pattern 1 is applied" ("When assignment pattern 2 is applied") corresponds to a case where each transmitter transmits a transmission signal with a mid amble pattern assigned according to assignment pattern 1 (assignment pattern 2) inserted and the receiver receives the signal sent from each transmitter above.

Figure 22A:
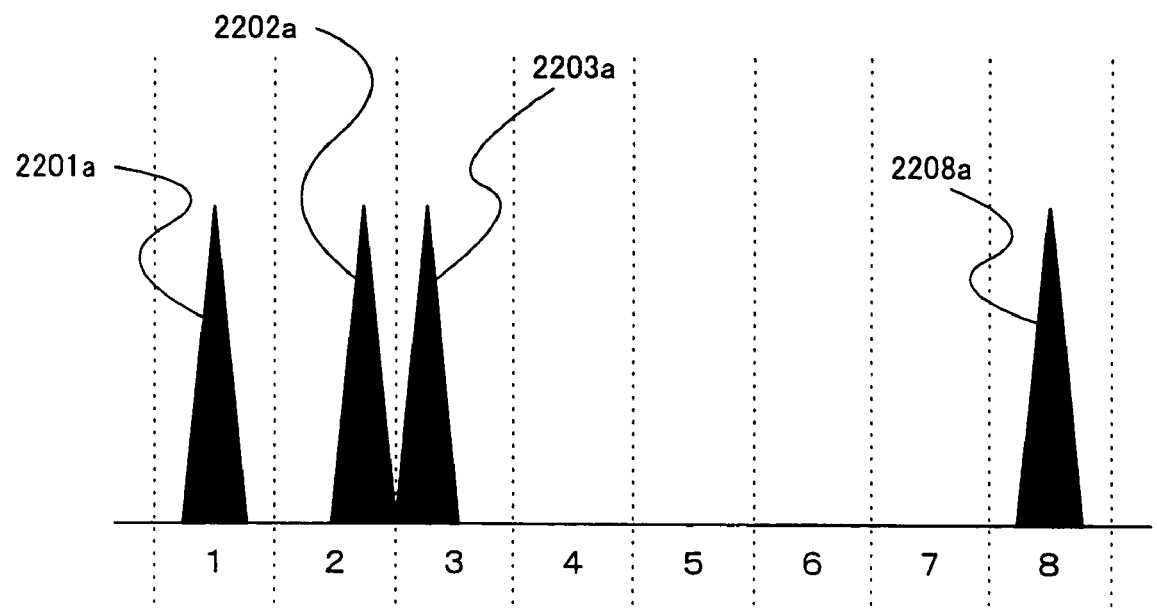
FIG. 22A illustrates an example of a delay profile created by correlation section 1604 in the receiver equipped with the communication apparatus according to Embodiment 2 above when assignment pattern 1 is applied.
Figure 22B:
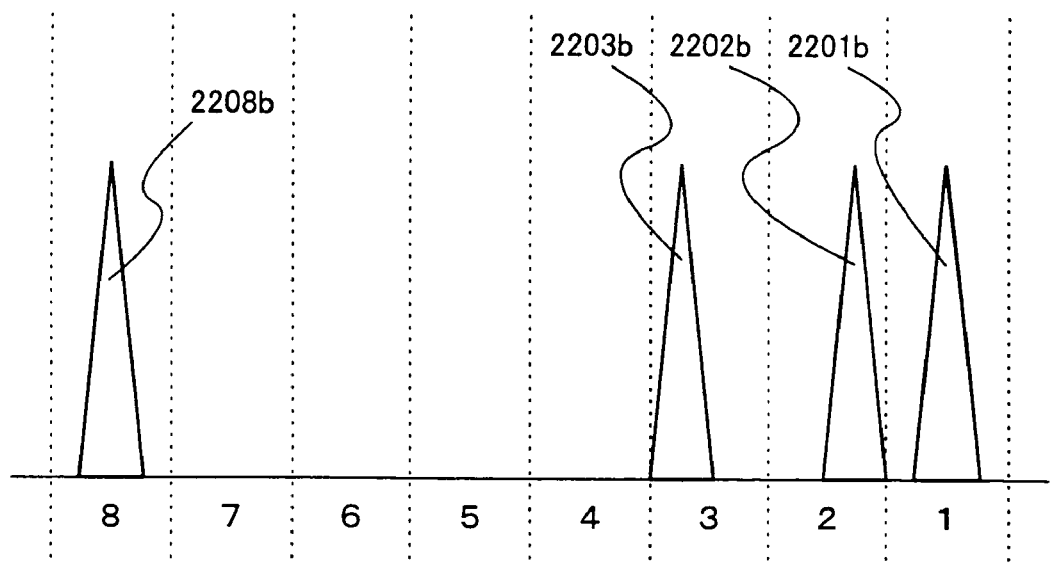
FIG. 22B illustrates an example of a delay profile created by correlation section 1604 in the receiver equipped with the communication apparatus according to Embodiment 2 above when assignment pattern 2 is applied.

FIG. 22A illustrates an example of a delay profile created by correlation section 1604 in the receiver equipped with the communication apparatus according to Embodiment 2 of the present invention when assignment pattern 1 is applied and FIG. 22B illustrates an example of a delay profile created by correlation section 1604 in the receiver equipped with the communication apparatus according to Embodiment 2 of the present invention when assignment pattern 2 is applied.

As shown in FIG. 22A, in a delay profile created by correlation section 1604 when assignment pattern 1 is applied, the correlation value reaches a maximum when the mid amble pattern from the transmitter contained in the 456-chip signal from separation section 1603 matches the above known basic code and a path of a certain size appears.

Therefore, for example, in FIG. 22A, the times at which the values of path 2201a, path 2202a, path 2203a and path 2208a reach their maximum values correspond to the times at which the mid amble patterns contained in the above 456-chip signal from transmitter 1, transmitter 2, transmitter 3 and transmitter 8 match the above known basic codes.

In the same way as shown in FIG. 22B, in a delay profile created by correlation section 1604 when assignment pattern 2 is applied, the correlation value reaches a maximum when the mid amble pattern from the transmitter contained in the 456-chip signal from separation section 1603 matches the above known basic code and a path of a certain size appears.

Therefore, for example, in FIG. 22B, the times at which the values of path 2201b, path 2202b, path 2203b and path 2208b reach their maximum values correspond to the times at which the mid amble patterns contained in the above 456-chip signal from transmitter 1, transmitter 2, transmitter 3 and transmitter 8 match the above known basic codes.

Also, as described above, when the total of a propagation delay and delay dispersion of each transmitter is smaller than a W (=57) chip length, the section where the path of a certain size on the delay profile appears is determined for each transmitter. That is, in the above case, the paths corresponding to transmitters 1 to 8 appear in W-chip sections 1 to 8 (delay profile width) in the delay profiles shown in FIG. 22A and FIG. 22B.

The W chip section of each channel (each transmitter) in FIG. 22A has a reverse positional relationship with respect to the W chip section of each channel in FIG. 22B. This is because the method of creating a mid amble pattern corresponding to each transmitter differs between pattern 1 and pattern 2, or more specifically, the order of assignment of mid amble patterns of phase 1 to phase 8 corresponding to their respective transmitters differs between assignment pattern 1 and assignment pattern 2.

Moreover, since correlation section 1604 carries out correlation value calculation processing using cyclic basic codes, the delay profiles shown in FIG. 22A and FIG. 22B are cyclic.

That is, W chip section 8 is placed immediately before W chip section 1 in FIG. 22A and W chip section 7 is placed immediately before this W chip section 8 and W chip sections 6, 5, 4 . . . are placed in the same way. Also, W chip sections 1, 2, 3 . . . are placed immediately after W chip section 8 in FIG. 22A. On the contrary, W chip section 1 is placed immediately before W chip section 8 in FIG. 22B and W chip section 2 is placed immediately before this W chip section 1 and W chip sections 3, 4, 5 . . . are placed in the same way. Also, W chip sections 8, 7, 6 . . . are placed immediately after chip section 1 in FIG. 22B.

Comparison/channel estimation section 1606 carries out channel estimation using above two delay profiles. Here, a case where channel estimation is performed for channel 1 (transmitter 1) is explained as an example. By the way, channel estimation of channels other than channel 1 can also be performed in the same way as in the case of channel 1.

According to the transmission signal of channel 1 in FIG. 20 and FIG. 21 above, if, when assignment pattern 1 and assignment pattern 2 are applied, the period for creating a delay profile is assumed to be smaller than the period during which the propagation environment changes, the receiver shown in FIG. 16 can be considered to have received the mid amble pattern of channel 1 in FIG. 20 and the mid amble pattern of channel 1 in FIG. 21 almost at the same time. Therefore, the I component and Q component corresponding to path 2201a of channel 1 in the delay profile shown in FIG. 22A are almost the same as the I component and Q component corresponding to path 2201b of channel 1 in the delay profile shown in FIG. 22B. That is, the difference in the I component and Q component between path 2201a of channel 1 in the delay profile shown in FIG. 22A and path 2201b of channel 1 in the delay profile shown in FIG. 22B is within a predetermined error range.

For this reason, the size of the path of channel 1 in the delay profile shown in FIG. 22A and the size of the path of channel 1 in the delay profile shown in FIG. 22B are almost the same, and the propagation delay of channel 1 detected from the delay profile shown in FIG. 22A and the propagation delay of channel 1 detected from the delay profile shown in FIG. 22B are almost the same.

That is, when the period of creating a delay profile is smaller than the period during which the propagation environment changes, in the delay profiles shown in FIG. 22A and FIG. 22B, the I component and Q component corresponding to path 1 are almost the same and the phase at which the value of path 2201a reaches a maximum and the phase at which the value of path 2201b reaches a maximum are almost the same. In other words, when the period of creating a delay profile is smaller than the period during which the propagation environment changes, any two paths whose differences in the I component and Q component are beyond a predetermined error range, that is, any two paths whose differences in path phase and size are beyond a predetermined error range can be considered not to be paths of the same channel.

Figure 23A:
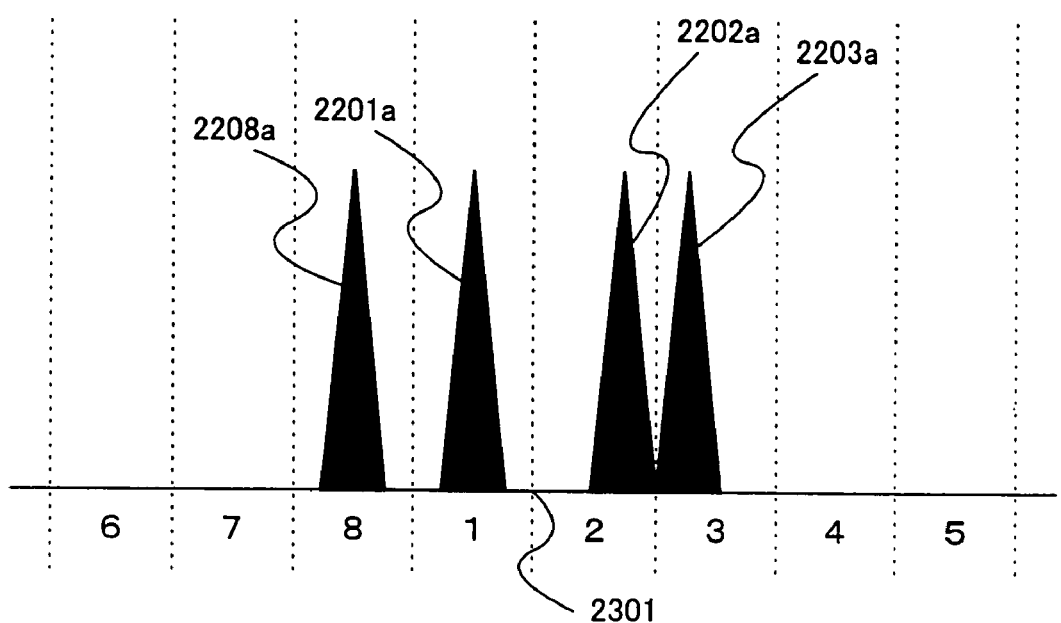
FIG. 23A illustrates an example of a delay profile after cycling created by correlation section 1604 in the receiver equipped with the communication apparatus according to Embodiment 2 above when assignment pattern 1 is applied.

Thus, comparison/channel estimation section 1606 cycles the above two delay profiles using the W chip section of channel 1 as the reference. As a result, the delay profile shown in FIG. 22A is cycled as shown in FIG. 23A. The delay profile shown in FIG. 22B is cycled as shown in FIG. 23B.

Figure 23B:
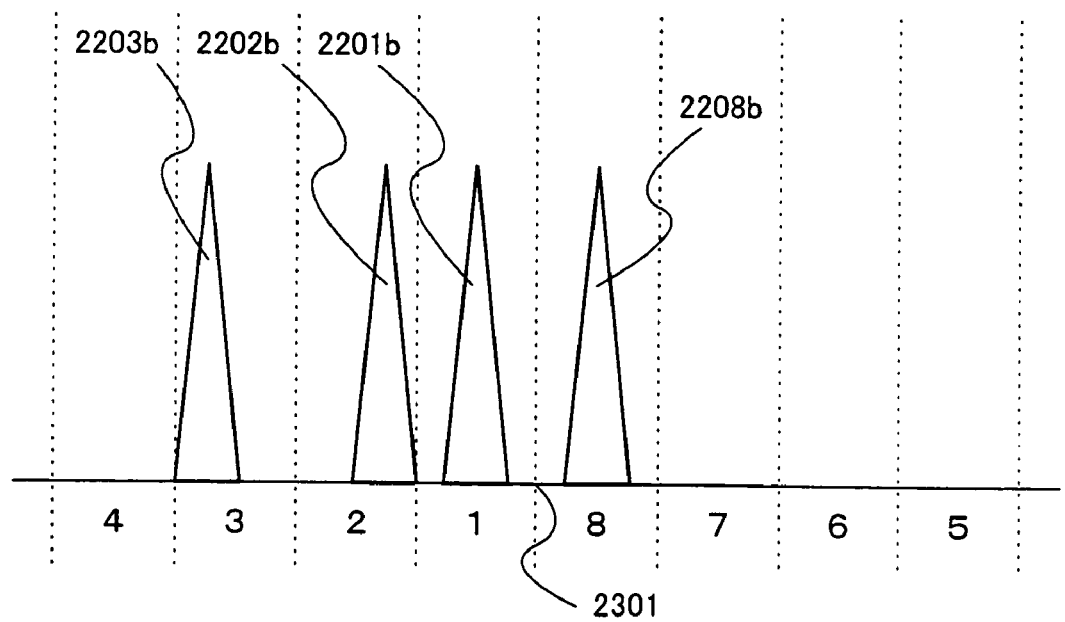
FIG. 23B illustrates an example of a delay profile after cycling created by correlation section 1604 in the receiver equipped with the communication apparatus according to Embodiment 2 above when assignment pattern 2 is applied.
Figure 24:
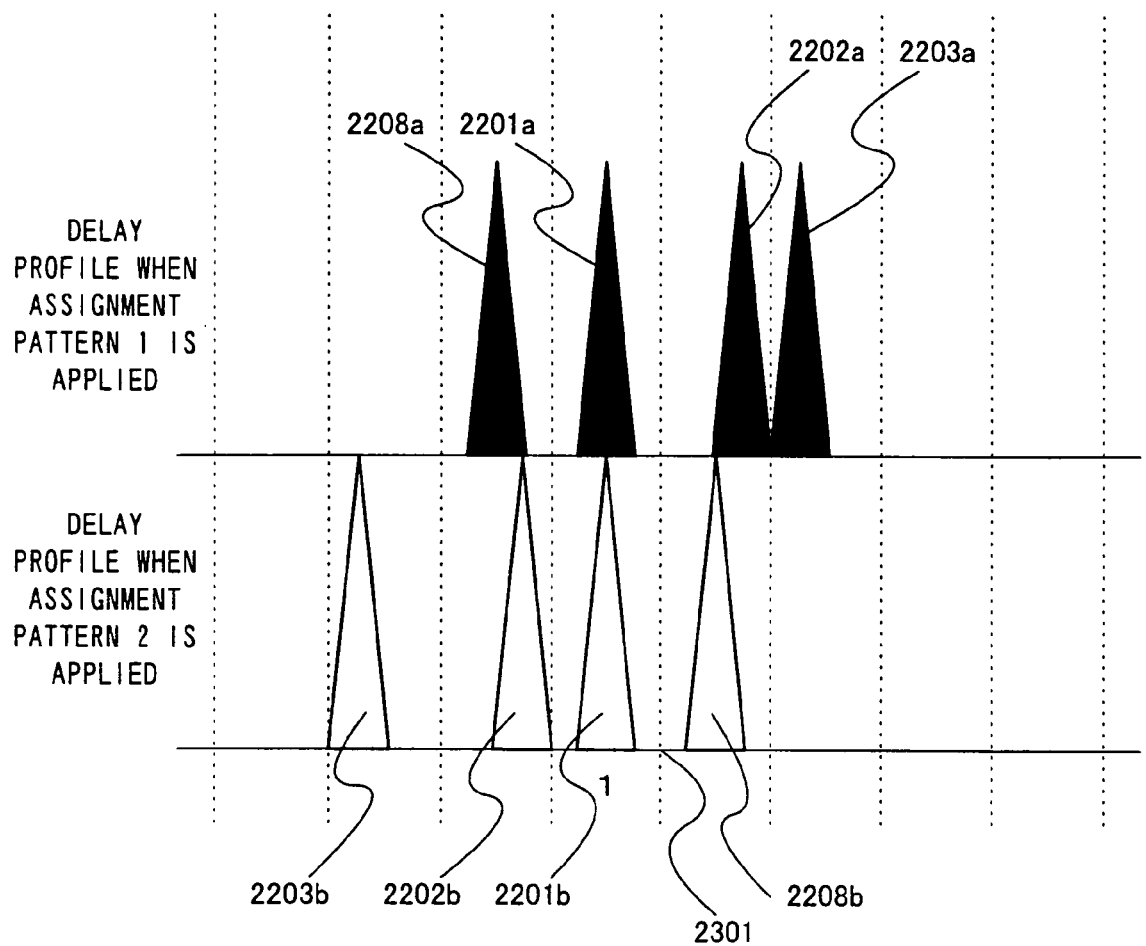
FIG. 24 illustrates a situation of a comparison of a delay profile after position adjustment created by correlation section 1604 in the receiver equipped with the communication apparatus according to Embodiment 2 above when each assignment pattern is applied.

Then, the delay profiles are compared after adjusting the positions of the delay profiles after the cycling shown in FIG. 23A and FIG. 23B so that their W chip sections of channel 1 match, that is, their phases (reference phases) 2301 at which the size of the path of the desired wave (main wave) when there is no delay in channel 1 reaches a maximum match. FIG. 24 shows delay profiles after the position adjustment.

More specifically, as a result of a comparison between delay profiles after the position adjustment, if matching paths are found, that is, if there are two paths whose differences in the phase and size are within a predetermined error range, those paths are used as the paths for channel 1. In this way, the propagation delay of channel 1 is detected. Here, the above predetermined error range can be set according to various conditions as appropriate.

By the way, if the total of a propagation delay and delay dispersion is longer than the W chip length, in the delay profiles shown in FIG. 22A and FIG. 22B, for example, the path of channel 1 appears in the W chip section of another channel, not in the W chip section of channel 1. This makes it difficult to detect the path of channel 1 according to the conventional method.

However, in this embodiment, when the period of creating a delay profile is smaller than the period during which the propagation environment changes, as described above, the delay profiles created when assignment pattern 1 and assignment pattern 2 are applied have almost the same I component and Q component corresponding to their respective channels. That is, these delay profiles have almost the same size of path and phase difference.

Moreover, as described above, since the order of assigning mid amble patterns of phase 1 to phase 8 corresponding to their respective transmitters differs between assignment pattern 1 and assignment pattern 2, as is clear from each delay profile (for example, FIG. 22) when assignment pattern 1 is applied and when assignment pattern 2 is applied, the W chip section of a channel adjacent to the W chip section of another channel is mutually opposite between the delay profiles.

For example, when attention is focused on the W chip section of channel 3, in the delay profile of FIG. 22A, the W chip section of channel 4 is located to the right in the figure and the W chip section of channel 2 is located to the left in the figure. On the contrary, in the delay profile of FIG. 22B, the W chip section of channel 2 is located to the right in the figure and the W chip section of channel 4 is located to the left in the figure.

Thus, in these delay profiles, it can be said that the path size and phase of one channel hardly match the path size and phase of another channel completely. In other words, in these delay profiles, paths with the same size and phase are likely to be paths of the same channel.

Figure 25:
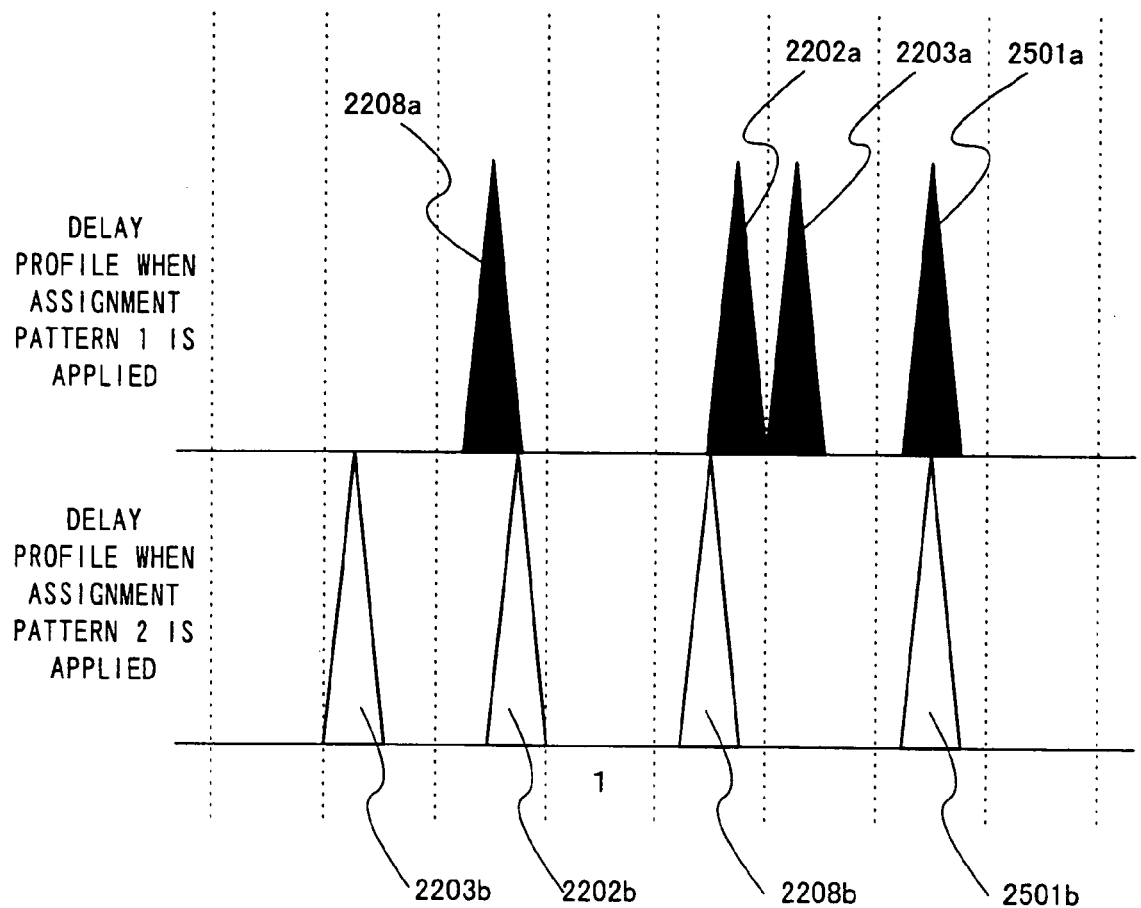
FIG. 25 illustrates a situation of a comparison of a delay profile (with a large propagation delay) after position adjustment created by correlation section 1604 in the receiver equipped with the communication apparatus according to Embodiment 2 above when each assignment pattern is applied.

Therefore, it is also possible to carry out channel estimation of each channel using the above method even in the case where the total of a propagation delay and delay dispersion is greater than the W chip length. For example, as shown in FIG. 25, if the delay propagation of a signal from channel 1 is longer than the W chip length, the path of channel 1 does not appear in the W chip section of channel 1 in the two delay profiles. Here, for the reason described above, quasi-matching paths, that is, paths whose difference in size and phase is within a predetermined error range, can be recognized as paths of the same channel. In FIG. 25, path 2501a and path 2501b have almost the same size and phase, and therefore this path 2501a (path 2501b) is detected as the path of channel 1.

Figure 26:
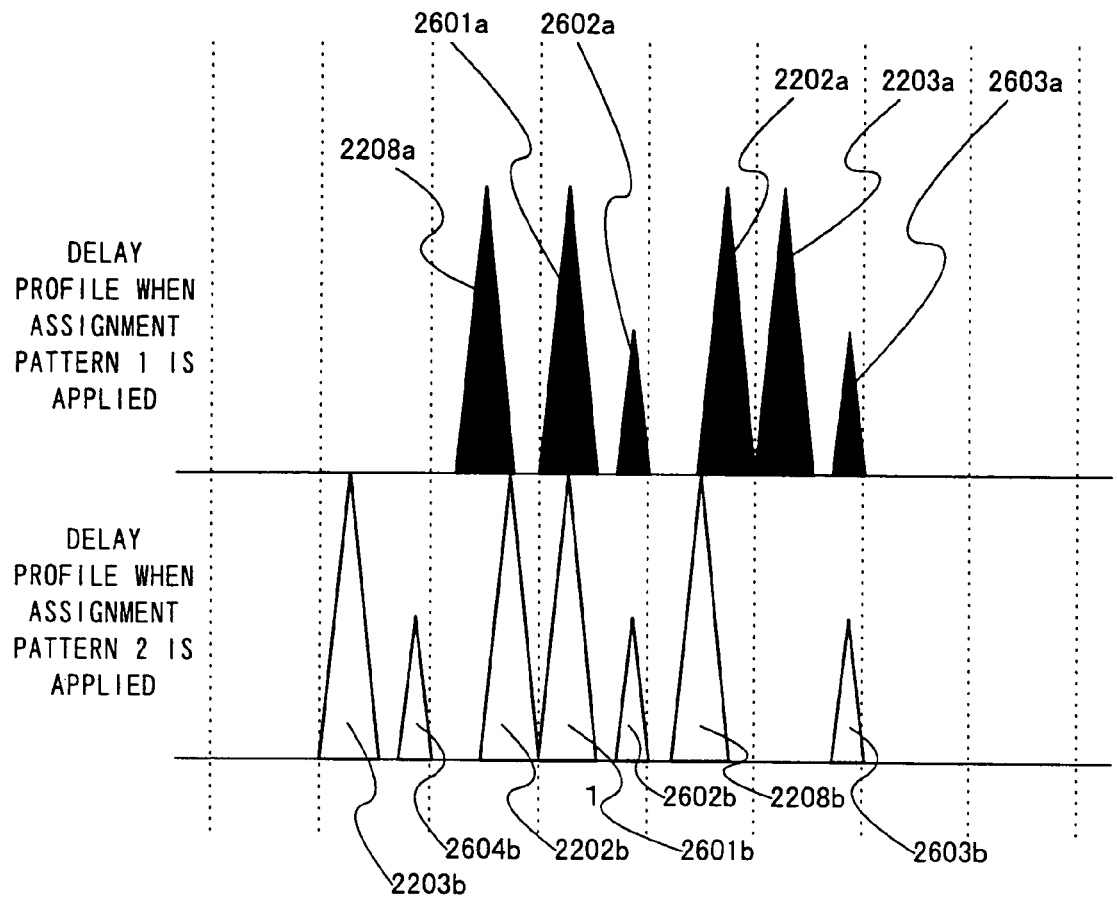
FIG. 26 illustrates a situation of a comparison of a delay profile (when a delay wave exists) after position adjustment created by correlation section 1604 in the receiver equipped with the communication apparatus according to Embodiment 2 above when each assignment pattern is applied.

The explanation above describes the case where the receiver equipped with the communication apparatus according to this embodiment only receives a desired wave of each channel, but the above receiver is applicable not only when a desired wave (main wave) is received but also when a delay wave is received. An example of two delay profiles in this case is shown in FIG. 26.

As described above, when the period of creating a delay profile is smaller than the period during which the propagation environment changes, the delay profiles created when assignment pattern 1 is applied and assignment pattern 2 is applied have almost the same I component and Q component corresponding to the path of the delay wave of each channel. That is, the delay profiles also have almost the same size of path of the delay wave of each channel and phase difference.

Therefore, according to the channel estimation method above, the path of not only a desired wave but also a delay wave can be detected for each channel. That is, in the delay profiles whose position has been adjusted so that the W chip sections of channel 1 shown in FIG. 26 match, path 2601a and path 2601b, path 2602a and path 2602b, and path 2603a and path 2603b are almost identical in their size and phase difference. From this, it is clear that these paths are the paths that correspond to channel 1.

More specifically, from the path size, it is assumed that path 2601a (path 2601b) is the path of the desired wave of channel 1, and path 2602a (path 2602b) and path 2603a (path 2603b) are the paths of the delay wave of channel 1. Regarding path 2604b, there is no equivalent in size and phase in the delay profile created when assignment pattern 1 is applied, and therefore path 2604b is assumed to be the path of a delay wave of a channel other than channel 1.

The explanation so far has been focused on the case where the period of creating a delay profile is smaller than the period during which the propagation environment changes, that is, the propagation environment does not change when assignment pattern 1 is applied and when assignment pattern 2 is applied, but the period of creating a delay profile is often greater than the period during which the propagation environment changes. The following is an explanation of the channel estimation method in comparison/channel estimation section 1606 when the period of creating a delay profile is greater than the period during which the propagation environment changes.

When the period of creating a delay profile is greater than the period during which the propagation environment changes, the delay profiles created when assignment pattern 1 and assignment pattern 2 are applied are unlikely to be identical in the I component and Q component corresponding to the path of a certain channel and are also unlikely to be identical in the size of path of a channel.

However, when the period of creating a delay profile is greater than the period during which the propagation environment changes, a time variation in the amount of delay of a channel is slower than that of the size of the path of the channel and the I component and Q component. Therefore, when the period of creating a delay profile is greater than the period during which the propagation environment changes, the amount of delay of a channel may be focused.

More specifically, when the period of creating a delay profile is greater than the period during which the propagation environment changes, in the delay profiles created when assignment pattern 1 and assignment pattern 2 are applied, comparison/channel estimation section 1606 can decide that any two paths whose difference in the amount of delay falls below a predetermined error range and whose size exceeds a predetermined threshold are paths of the same channel, while any two paths whose difference in the amount of delay exceeds a predetermined error range are not paths of the same channel. Here, suppose the amount of delay can be, for example, a shift of phase from reference phase 2301 during channel estimation about channel 1 (see FIG. 23).

As shown above, the propagation delays (here propagation delays of three paths) of each channel detected by comparison/channel estimation section 1606 are sent to correlation sections 1608 to 1610 in FIG. 16. This allows correlation sections 1608 to 1610 to perform despreading processing on the reception signal stored in storage section 1607 at timing taking account of their respective propagation delays.

Furthermore, by carrying out the aforementioned channel estimation, comparison/channel estimation section 1606 can detect a propagation delay about each channel. Thus, comparison/channel estimation section 1606 can generate a time alignment control signal to perform time alignment control over each transmitter. That is, since comparison/channel estimation section 1606 can detect a propagation delay of each channel (each transmitter), it is possible to set for each channel how much transmission timing should be shifted so that the path appears in a W chip section in the delay profile. In this way, comparison/channel estimation section 1606 can generate a time alignment control signal to indicate each channel the transmission timing. Thus, this receiver can perform transmission timing control over each transmitter.

Thus, this embodiment creates a plurality of mutually different mid amble patterns using cyclic basic codes. Furthermore, the above plurality of mid amble patterns is assigned to each transmitter every unit time so that different mid amble patterns are assigned to transmitters (channels) at adjacent unit times. More specifically, in delay profiles created by the receiver at adjacent unit times, the above plurality of mid amble patterns is assigned to the transmitters every unit time so that the condition that a W chip section adjacent to another channel W chip section should not match the W chip section of the same channel be satisfied for all channels.

On the other hand, the receiver creates a delay profile every unit time, compares the I component and Q component of the path, the size of the path and amount of delay of the path, etc. in each delay profile created at adjacent unit times, and thus can perform accurate channel estimation of each channel even if the propagation delay is greater than the W chip length or a delay wave exists.

This allows a propagation delay of each channel to be accurately detected without affecting the number of channels accommodated, making it possible to extract a high precision demodulated signal and perform time alignment control for each transmitter.

This embodiment describes, as an example, the case where mid amble patterns are created and the created mid amble patterns are assigned according to the above method, but the present invention is not limited to this and can also be applied to cases where when creating mid ambles, the length of one cycle of a cyclic basic code, the direction in which a reference block is shifted in the 2nd step, the number of chips the reference block is shifted, the total number of channels, etc. are changed as appropriate, and can also be applied when assigning mid amble patterns, assignment patterns and assignment change patterns are changed as appropriate, provided that the following condition is satisfied:

That is, in each delay profile created at adjacent unit times, it is necessary to create mid amble patterns so that a W chip section adjacent to another channel W chip section should not match the W chip section of the same channel and assign the mid amble patterns created to each channel every unit time.

Here, an example of a case where the method of assigning mid amble patterns is changed will be explained with reference to FIG. 27 and FIG. 28. FIG. 27 illustrates a second example of the method of assigning mid amble patterns to each channel of the communication apparatus according to Embodiment 1 of the present invention. FIG. 28 illustrates a second example showing how to apply the assignment method shown in FIG. 27 of the communication apparatus according to Embodiment 1 of the present invention. Regarding the method of creating a mid amble patterns, suppose the same method as that described above will be applied as an example.

In FIG. 27, four assignment patterns are provided; assignment pattern 2 to assignment pattern 5, and mid amble patterns assigned to each channel are changed every assignment pattern except for channel 1, channel 3, channel 5 and channel 7.

Furthermore, in FIG. 28, as the assignment patterns to be actually used, above assignment patterns 2 to 5 are changed sequentially every unit time.

If the assignment methods shown in FIG. 27 and FIG. 28 are used, W chip sections adjacent to a W chip section of each channel are not W chip sections of the same channel in delay profiles created by the receiver at adjacent unit times. That is, if time[T+1] and time [T+2] in FIG. 28 are taken as examples of adjacent unit times, in each delay profile created at time [T+1], that is, when assignment pattern 3 is applied and at time [T+2], that is, when assignment pattern 4 is applied, the W chip section adjacent to, for example, channel 3 is a W chip section of channel 4 (left) and channel 6 (right) when assignment pattern 3 is applied, while it is a W channel section of channel 6 (left) and channel 8 (right) when assignment pattern 4 is applied.

In each delay profile created at adjacent unit time, that W chip sections adjacent to each channel are not the W chip sections of the same channel is always satisfied for all channels.

The mid amble pattern assignment method shown in FIG. 27 and FIG. 28 is only an example and it is possible to increase or decrease the number assignment patterns or change the order in which assignment patterns are applied as appropriate.

Furthermore, the result of the channel estimation explained in this embodiment can be used for path limitations in the interference removal and demodulation processing.

Embodiment 3

This embodiment describes a case where delay profiles created when a same assignment pattern is applied in Embodiment 2 are averaged and a propagation delay of each channel is detected using the averaged delay profiles.

In Embodiment 2, if the period of creating a delay profile is longer than the period during which the propagation environment changes, using each delay profile created when two assignment patterns are applied, the amount of path delay is used instead of the I component and Q component of the path and the size of the path when detecting a propagation delay of each channel. However, if a propagation delay of each channel is detected only based on the amount of path delay, the amounts of delays of paths of mutually different channels may match by accident.

Thus, in this embodiment, delay profiles created when a same assignment pattern is applied are averaged. Hereinafter, the communication apparatus according to this embodiment will be explained with reference to FIG. 16 again. Detailed explanations of the parts of this embodiment with the same configuration as that of Embodiment 2 will be omitted and only differences from Embodiment 2 will be explained. Here, as an example, suppose mid amble patterns are assigned to each transmitter according to the method of assigning mid amble patterns explained above using FIG. 18 and FIG. 19.

In FIG. 16, storage section 1605 stores information on each delay profile created when assignment pattern 1 and assignment pattern 2 are applied every unit time.

Furthermore, storage section 1605 averages the information on the stored delay profile for a predetermined period at the above unit time for every assignment pattern. For example, in FIG. 19, if the predetermined period is from time [T−1] to time [T+4], storage section 1605 averages information on the delay profiles stored at time [T+0], time [T+2] and time [T+4] and averages information on the delay profiles stored at time [T−1], time [T+1] and time [T+3]. Storage section 1605 sends the information on the averaged delay profile to comparison/channel estimation section 1606 for every assignment pattern.

Comparison/channel estimation section 1606 compares delay profiles corresponding to each assignment pattern using the information on the delay profiles sent from storage section 1605 and detects a propagation delay of each channel according to the method described in Embodiment 2.

Thus, this embodiment averages information on delay profiles created when the same assignment pattern is applied and detects a propagation delay of each channel using the information on the averaged delay profile, thus making it possible to improve the accuracy in detecting a propagation delay of each channel. In particular, when the period of creating a delay profile is longer than the period during which the propagation environment changes, this embodiment makes it possible to reduce the probability that paths of mutually different channels will be erroneously recognized as paths of the same channel.

This embodiment describes the case where two assignment patterns are used as the method of assigning mid amble patterns for each channel, but the present invention is not limited to this and can also be applied when three or more assignment patterns are used. In this case, storage section 1607 stores information on delay profiles created when each assignment pattern is applied for every assignment pattern and averages the information on the stored delay profile for every assignment pattern. Furthermore, comparison/channel estimation section 1606 compares delay profiles corresponding to each assignment pattern and detects a propagation delay of each channel.

As described above, the present invention inserts a known reference code specific to a channel selected from among a plurality of mutually different known reference codes for a transmission signal every unit time on each channel, and further, through correlation value calculation processing using a signal over which transmission signals of channels into which channel-specific known reference codes from among the above plurality of known reference codes are inserted every unit time are multiplexed in a same frequency band and cyclic reference codes, creates delay profiles corresponding to the above each unit time and detects a delay of each channel using the delay profiles created, thus providing a communication apparatus capable of accurately detecting a propagation delay for each channel without affecting the number of channels accommodated.

Embodiment 4

Figure 29:
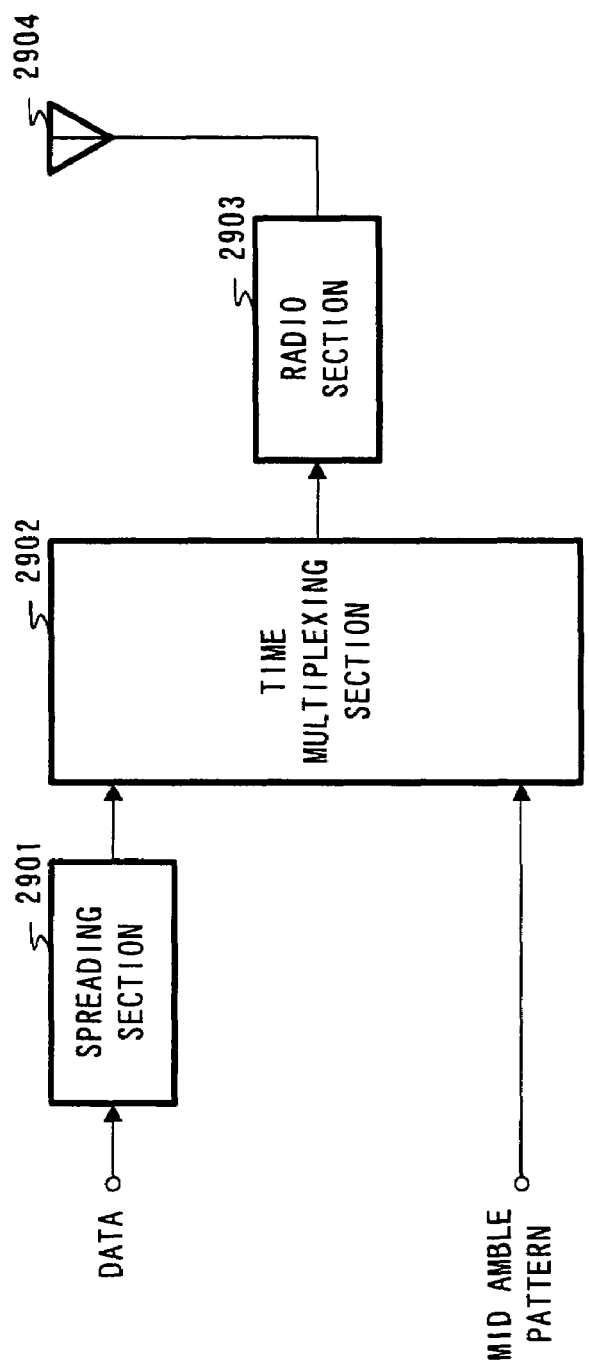
FIG. 29 is a block diagram showing a configuration of a mobile station apparatus carrying out radio communications with a base station apparatus equipped with a communication apparatus according to Embodiment 4 of the present invention.

FIG. 29 is a block diagram showing a configuration of a mobile station apparatus carrying out a radio communication with a base station apparatus equipped with a communication apparatus according to Embodiment 4 of the present invention. In FIG. 29, spreading section 2901 carries out spreading processing on transmission data using a spreading code assigned to this mobile station apparatus. Time multiplexing section 2902 creates a transmission signal by multiplexing a mid amble pattern assigned to this mobile station apparatus and the transmission data after spreading processing on frames. The mid amble pattern is a known signal used to create a delay profile on the base station apparatus side and is created using cyclic basic codes known to the base station apparatus. The mid amble pattern input to time multiplexing section 2902 is assigned specifically to each channel (each mobile station apparatus). Details of this mid amble pattern will be described later.

As the frame format, a format mainly including data section 1, a mid amble section and data section 2 is used as shown in FIG. 2. The mid amble section is a section into which a mid amble pattern is inserted. This embodiment describes a case where a mid amble pattern is inserted into the mid amble section in the frame format shown in FIG. 2, but the present invention is not limited to this and is also applicable to a case where a mid amble pattern is inserted into any part of the frame format.

Radio section 2903 carries out predetermined transmission processing such as the frequency conversion on the transmission signal created by time multiplexing section 2902 and transmits the transmission signal after the above processing through antenna 2904.

Figure 30:
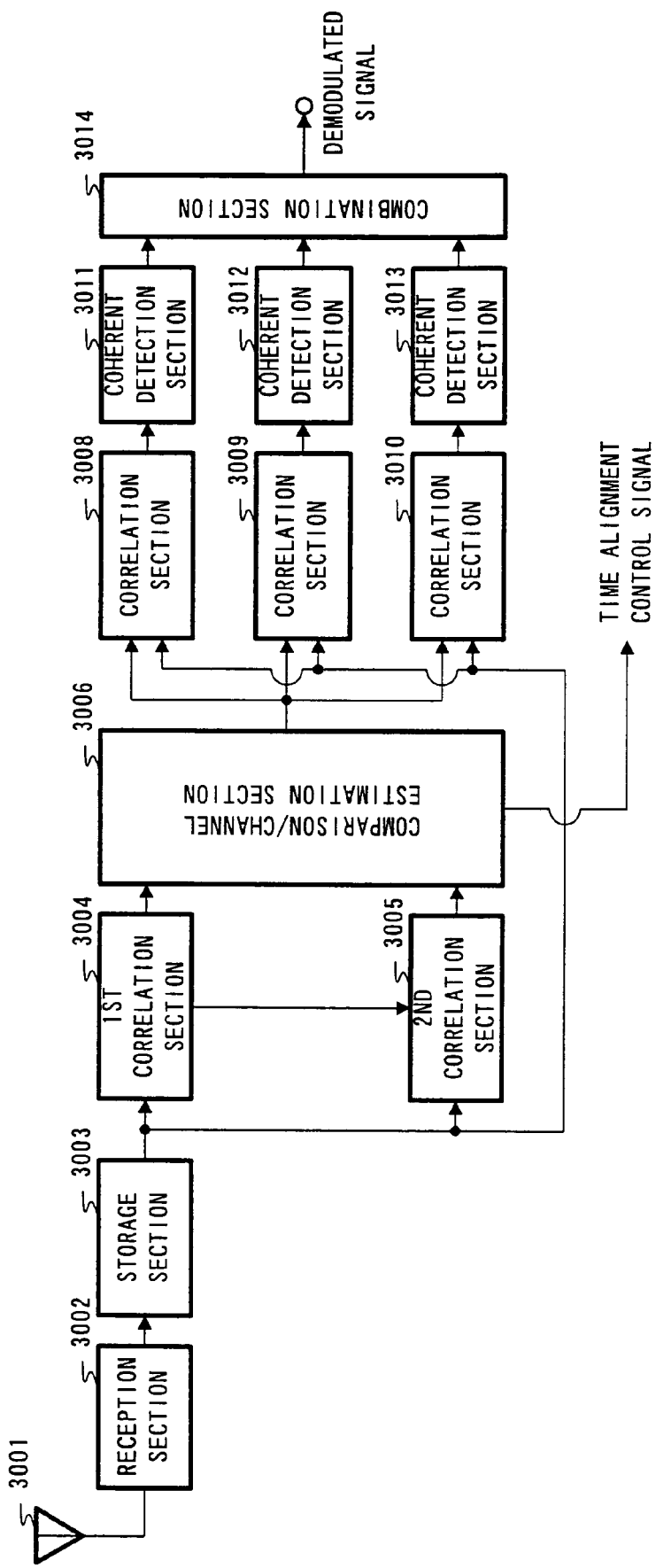
FIG. 30 is a block diagram showing a configuration of a base station apparatus equipped with the communication apparatus according to Embodiment 4 of the present invention.

FIG. 30 is a block diagram showing a configuration of the base station apparatus equipped with the communication apparatus according to Embodiment 4 of the present invention. In FIG. 30, reception section 3002 carries out predetermined reception processing such as frequency conversion on the signal (reception signal) received through antenna 3001 and sends the reception signal after the above processing to storage section 3003. This reception signal is a signal on which signals mainly transmitted by the mobile station apparatus are multiplexed in a same frequency band. Also, the above plurality of mobile station apparatuses each has the configuration shown in FIG. 29 and sends a signal to the base station apparatus shown in FIG. 30 using different channels and mid amble patterns.

Storage section 3003 stores the reception signal after the above processing and sends the stored reception signal after the above processing to 1st correlation section 3004, 2nd correlation section 3005 and correlation sections 3008 to 3010.

1st correlation section 3004 carries out correlation value calculation processing using the reception signal from storage section 3003 and the above cyclic basic codes and creates a delay profile using the calculated correlation value. Furthermore, 1st correlation section 3004 sends information on the created delay profile to 2nd correlation section 3005 and channel estimation section 3006. The information on the delay profile sent by 1st correlation section 3004 to channel estimation section 3006 is, for example, a correlation value (I component and Q component) obtained through correlation value calculation processing and size of each path (power value), etc.

2nd correlation section 3005 carries out correlation value calculation processing using the reception signal from storage section 3003 and a spreading code assigned to each channel based on the information on the delay profile from correlation section 3004 and sends the correlation value calculation result to channel estimation section 3006.

Channel estimation section 3006 performs channel estimation for each channel using the information on the delay profile from 1st correlation section 3004 and the correlation value calculation result from 2nd correlation section 3005. That is, channel estimation section 3006 detects the path for each channel and a delay propagation of this path using the information on the above delay profile and above correlation value calculation result. Moreover, channel estimation section 3006 creates a time alignment control signal using the channel estimation result, that is, the propagation delay detection result. This time alignment control signal will be described later.

Correlation sections 3008 to 3010 carry out despreading processing on the reception signal from storage section 3003 using the spreading code assigned to each channel based on the channel estimation result from channel estimation section 3006. Coherent detection sections 3011 to 3013 carry out coherent detection processing on the signals subjected to despreading processing by correlation sections 3008 to 3010, respectively. Combination section 3014 combines the signals subjected to coherent detection processing by coherent detection sections 3011 to 3013 and outputs a demodulated signal.

FIG. 30 shows, as the example, a configuration with 3 lines of correlation sections and coherent detection sections to explain a case where three paths are handled for each channel, but the present invention is also applicable when the number of lines of correlation sections and coherent detection sections is changed as appropriate.

Figure 31:
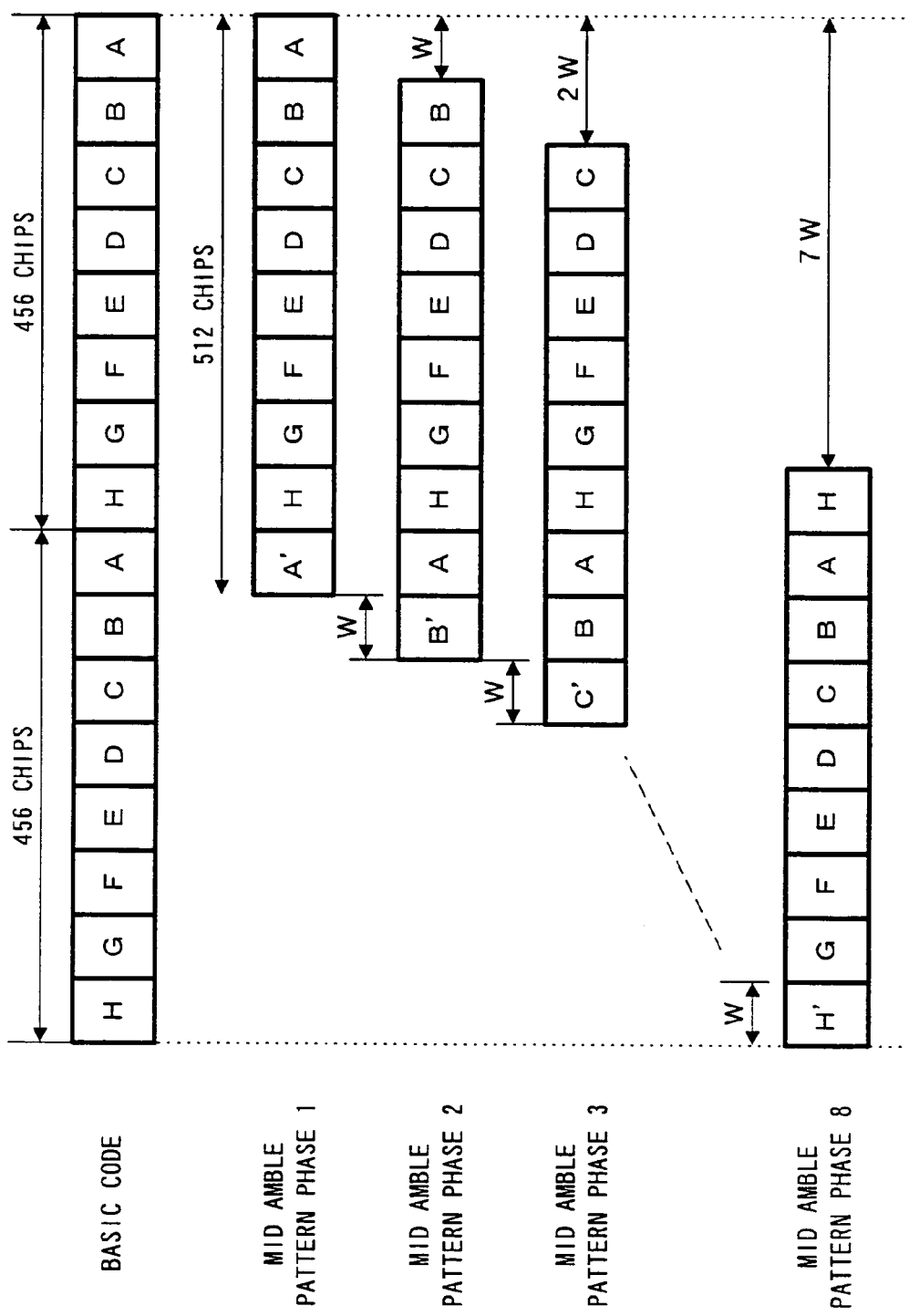
FIG. 31 is a schematic diagram showing a procedure for creating a mid amble pattern assigned to a mobile station apparatus carrying out a radio communication with the base station apparatus equipped with the communication apparatus according to Embodiment 4 of the present invention.

Next, the method of creating a mid amble pattern assigned to each channel will be explained with reference to FIG. 31. Here, as an example, suppose the total number of channels is 8. FIG. 31 is a schematic diagram showing a procedure for creating mid amble patterns assigned to the mobile station apparatus carrying out a radio communication with the base station apparatus equipped with the communication apparatus according to Embodiment 4 of the present invention. As shown in FIG. 31, a mid amble pattern used for each channel is created according to the procedure shown below using a basic code which cycles in a 456-chip (8 W) cycle. This basic code contains eight blocks "A" to "H" having a plurality of mutually different codes of a W (=57) chip length.

First, as a 1st step, a reference block is set in the above basic code. Here, suppose the reference block is "A".

As a 2nd step, the reference block above is shifted by $\{W \times (n-1)\}$ to the left in the figure. Here, W=57 chips and n is the number of channels. The phase to be shifted is 0, W, 2 W and 7 W in the case of channel 1, channel 2, channel 3 and channel 8, respectively. The reference block is "A", "B", "C" and "H" for channel 1, channel 2, channel 3 and channel 8, respectively.

As a 3rd step, 513 chips are extracted from the forefront of the reference block whose phase is shifted in the 2nd step in the above basic code. In this way, a mid amble pattern having a length of 513 chips as a whole is created for every channel. Furthermore, in each mid amble pattern of 513 chips in length, the first one chip of the first block is removed. In this way, a mid amble pattern having a length of 512 chips as a whole is created for every channel. In FIG. 31, in each mid amble pattern of 512 chips in length created for every channel, the 1st block corresponds to the last block whose 1st one chip is removed. For example, in the case of channel 1, first block "A'" corresponds to last block "A" whose 1st one chip is removed.

Figure 32:
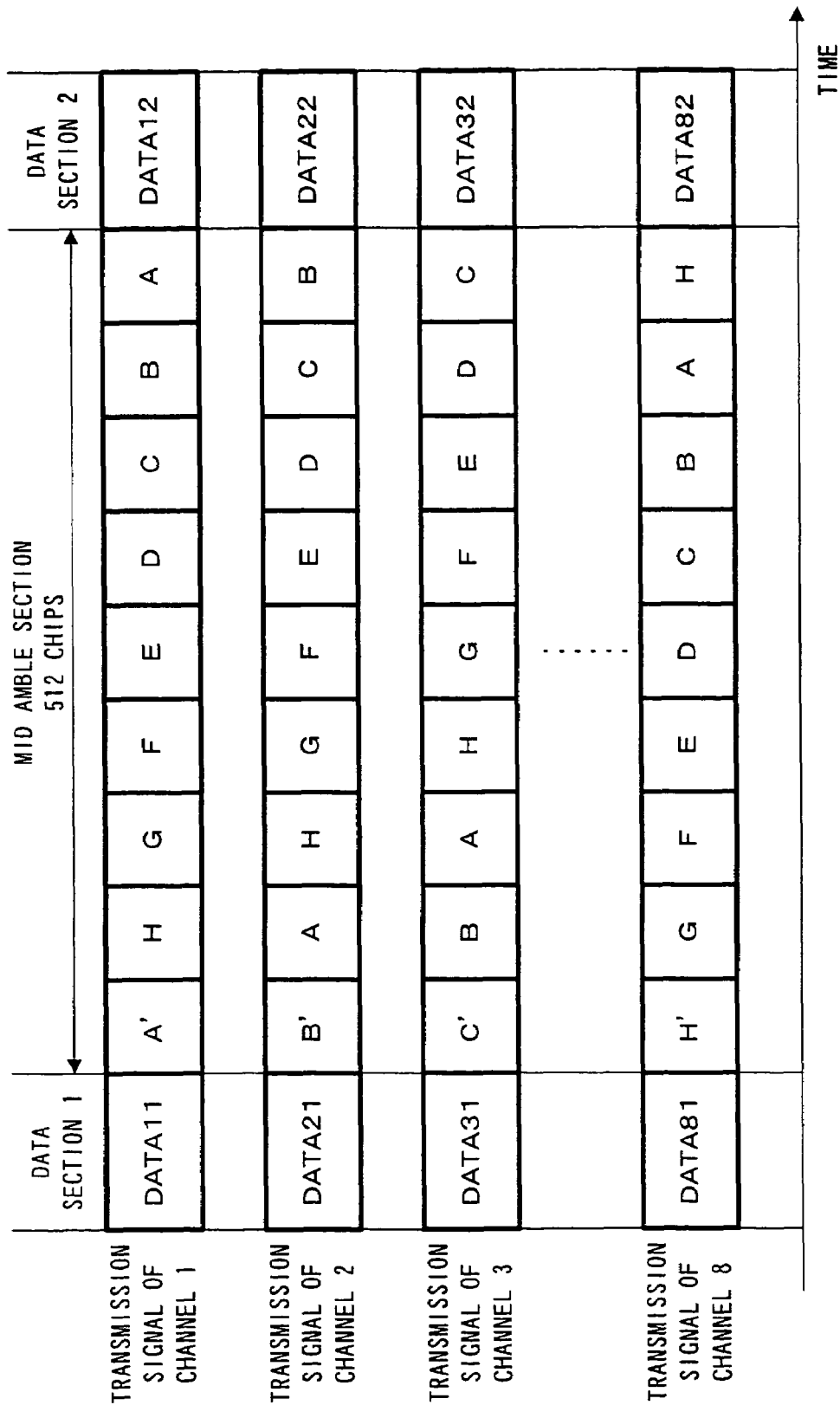
FIG. 32 is a schematic diagram showing an example of transmission timing of the mobile station apparatus carrying out a radio communication with the base station apparatus equipped with the communication apparatus according to Embodiment 4 of the present invention.

Then, operations of the mobile station apparatus (FIG. 29) and the base station apparatus (FIG. 30) with the above configurations will be explained with reference to FIG. 32. FIG. 32 is a schematic diagram showing an example of the transmission timing of the mobile station apparatus carrying out a radio communication with the base station apparatus equipped with the communication apparatus according to Embodiment 4 of the present invention.

In FIG. 29, transmission data is subjected to spreading processing using a spreading code assigned to this mobile station apparatus by spreading section 2901. The transmission data subjected to spreading processing is sent to time multiplexing section 2902. Furthermore, some of the plurality of the mid amble patterns described above are sent to time multiplexing section 2902. Here, for convenience of explanation in this embodiment, mid amble patterns 1 to 8 explained using FIG. 31 are assigned to mobile station apparatuses 1 to 8, respectively.

Time multiplexing section 2902 creates a transmission signal by multiplexing the transmission data after the spreading processing and mid amble patterns on frames. That is, a transmission signal is created by inserting the transmission data after the spreading processing into data sections (here data sections 1 and 2) in the frames shown in FIG. 32 and inserting mid amble patterns into the mid amble sections in the above frames. Here, the frames shown in FIG. 32 are only an example and there is no limit to the number of chips in the mid amble section and data sections in each frame.

The transmission signal created by time multiplexing section 2902 is subjected to predetermined transmission processing such as frequency conversion by radio section 2903 and transmitted through antenna 2904. More specifically, the mobile station apparatus with the configuration shown in FIG. 29 performs transmission to the base station apparatus at transmission timing as shown in FIG. 32.

Transmission signals sent from the mobile station apparatus are received multiplexed in a same frequency band by the base station apparatus. The signal received (reception signal) through antenna 3001 is subjected to predetermined reception processing such as the frequency conversion. The reception signal after the above processing is stored in storage section 3003. The stored reception signal after the above processing is sent to 1st correlation section 3004, 2nd correlation section 3005 and correlation sections 3008 to 3010.

In 1st correlation section 3004, of the reception signal from storage section 3003, the 512-chip signal received from the 1st reference time is separated and of the separated 512-chip signal, only 456 chips are cut from the end part. The 1st reference time corresponds to the time when the forefront of each mid amble section in the signal transmitted by each mobile station apparatus is received by this base station apparatus.

Figure 33:
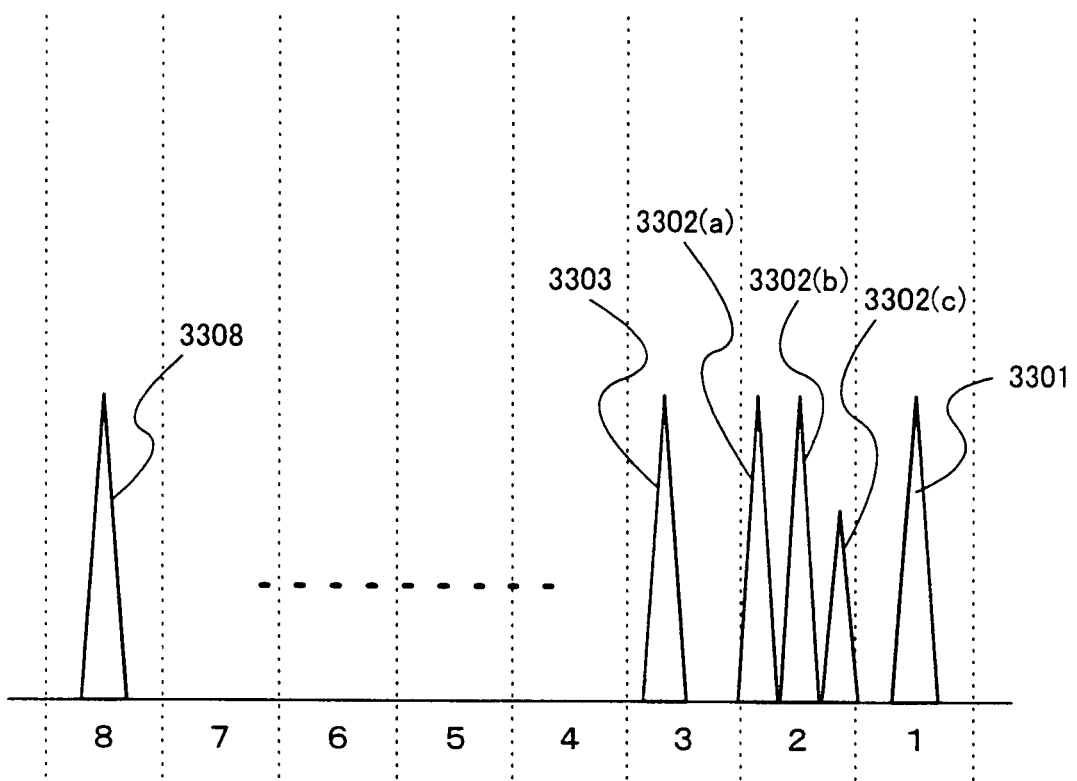
FIG. 33 is a schematic diagram showing an example of a delay profile created by the base station apparatus equipped with the communication apparatus according to Embodiment 4 of the present invention.

1st correlation section 3004 calculates a value of correlation between the above 456-chip reception signal and a cyclic basic code, and then creates a delay profile using the calculated correlation value. FIG. 33 shows an example of a delay profile created. FIG. 33 is a schematic diagram showing an example of a delay profile created by the base station apparatus equipped with the communication apparatus according to Embodiment 4 of the present invention. The delay profile shown in FIG. 33 is only an example, and in actual delay profiles, various kinds of timing and paths of various sizes appear in each W chip section.

When calculating correlation values as described above, the correlation value reaches a maximum and a path of a certain size appears at timing at which the mid amble pattern included in the above 456-chip reception signal from one of the mobile station apparatuses coincides with the above known basic code. In FIG. 33, for example, in W chip sections 8, 3, 2 and 1, path 3308, path 3303, paths 3302 (*a*) to (*c*) and path 3301 appear respectively.

That in the delay profile shown in FIG. 33 alone, path 3301, paths 3302 (*a*) to (*c*), path 3303 and path 3308 correspond to the paths of mobile station apparatuses 1, 2, 3 and 8 respectively is true if the total of a propagation delay and delay dispersion about each mobile station apparatus is smaller than the W chip, but is not necessarily true if the total of a propagation delay and delay dispersion about each mobile station apparatus is greater than the W chip. That is, in the latter case, in paths 3302 (*a*) to (*c*) in W chip section 2, for example, it is impossible to decide which path is the path about mobile station apparatus 2 and which path is the path about another mobile station apparatus.

Thus, this embodiment recognizes the path about each mobile station apparatus using a correlation value calculated using mid amble codes and a correlation value calculated using the data sections. To do this, the information on the delay profile created by 1st correlation section 3004 is sent to 2nd correlation section 3005 and channel estimation section 3006. Here, the information on the delay profile is the information that makes clear what path appears in each W chip section. That is, in the example shown in FIG. 33, the information on the delay profile is the information that makes clear that path 3301 is detected in W chip section 1 (mobile station apparatus 1) and paths 3302 (*a*) to (*c*) are detected in W chip section 2 (mobile station apparatus 2).

2nd correlation section 3005 performs correlation value calculation processing using the reception signal from storage section 3303 and a spreading code assigned to each channel based on the information on the delay profile from 1st correlation section 3004.

More specifically, the start timing of data section 1 (information signal) in the reception signal corresponding to each path is estimated first on assumption that the path about each mobile station apparatus in the delay profile exists in the expected W chip section. That is, with reference to the delay profile shown in FIG. 33, on assumption, for example, that path 3303 is the path about mobile station apparatus 3, the timing at which the size of path 3303 reaches a maximum is estimated to be the start timing of the mid amble section in the reception signal corresponding to path 3303 (that is, reception signal of mobile station apparatus 3). Thus, the timing ahead of this start timing by a predetermined number of chips (number of chips of data section 1) is estimated to be the start timing of data section 1 in the reception signal corresponding to path 3303 (that is, reception signal of mobile station apparatus 3).

Second, 1st correlation section 3004 carries out correlation value calculation processing for all paths detected using the spreading code assigned to data section 1 of the mobile station apparatus corresponding to each path and the signal consisting of a predetermined number of chips (here, suppose 16 chips) extracted from the reception signal sent from storage section 3003 at the timing corresponding to the above path. This embodiment describes the case where data section 1 is used as the data section used for correlation value calculation processing and the number of chips of the data section used for correlation value calculation processing is 16, but the present invention is not limited to this and it goes without saying that the present invention is also applicable to cases where data section 2, etc. is used as the data section used for correlation value calculation processing and the number of chips of the data section used for correlation value calculation processing can be changed as appropriate.

In this way, the correlation value calculation processing result is obtained for every path detected by 1st correlation section 3004. This correlation value calculation processing result is sent to channel estimation section 3006.

According to such correlation value calculation processing by 2nd correlation section 3005, regarding a path appearing in a correct W chip section (that is, a path about a mobile station apparatus whose propagation delay is a W chip length or less) in the delay profile calculated by 1st correlation section 3004, the start timing of data section 1 in the reception signal estimated based on this path is correct, and therefore a large correlation value is calculated. On the contrary, regarding a path appearing in a wrong W chip section in the above delay profile (a path about a mobile station apparatus whose propagation delay is greater than a W chip length), the start timing of data section 1 in the reception signal estimated based on this path is wrong, and therefore a small correlation value is calculated.

From this, the result of correlation value calculation processing by 2nd correlation section 3005 can be an index in deciding whether the path appearing in the W chip section of the delay profile calculated by 1st correlation section 3004 is the path about the mobile station apparatus corresponding to this W chip section or not.

Channel estimation section 3006 carries out channel estimation about each channel using the information on the delay profile from 1st correlation section 3004 and the correlation value calculation processing result from 2nd correlation section 3005. Here, a case where channel estimation of channel 2 (mobile station apparatus 2) is carried out is explained as an example. In the delay profile shown in FIG. 33, paths 3302 (*a*) and (*c*) are paths corresponding to channel 2, a main wave and delay wave, respectively. Channel estimation of channels other than channel 2 can be carried out in the same way as for channel 1.

First, it is recognized that as shown in FIG. 33, paths 3302 (*a*) to (*c*) appear in W chip section 2 corresponding to channel 2 based on the information on the delay profile from 1st correlation section 3004.

Second, the correlation value about the above path is compared with a threshold based on the correlation value calculation processing result from 2nd correlation section 3005. As described above, the correlation value calculation processing result from 2nd correlation section 3005 has a nature that the correlation value calculated based on the path appearing in a correct W chip section is large, while the correlation value calculated based on the path appearing in a wrong W chip section is small.

Thus, it is possible to decide which of paths 3302 (*a*) to (*c*) is the path about mobile station apparatus 2 by comparing the correlation value calculation results of paths 3302 (*a*) to (*c*) from 2nd correlation section 3005 with a threshold. That is, of paths 3302 (*a*) to (*c*) the path whose correlation value calculation result from 2nd correlation section 3005 is equal to or greater than the threshold can be decided as the path about mobile station apparatus 2 and the path whose correlation value calculation result from 2nd correlation section 3005 is equal to or smaller than the threshold can be decided as the path about any mobile station other than mobile station apparatus 2. Therefore, paths 3302 (*a*) to (*c*) are decided to be the paths about mobile station apparatus 2, while path 3302 (*b*) is decided to be the path about any mobile station other than mobile station apparatus 2.

At this point in time, it is not possible to decide to which mobile station apparatus path 3302 (*b*) is related. In this way, during channel estimation of a channel, if a path of another channel is found in the W chip section corresponding to this channel, it is possible to detect to which channel the above other path belongs by carrying out the following processing.

As is clear from the delay profile shown in FIG. 33, path 3302 (*b*) is likely to be a path corresponding to one of mobile station apparatuses 3 to 8. Thus, in the first place, 2nd correlation section 3005 carries out correlation value calculation processing using the spreading codes assigned to data section 1 corresponding to mobile station apparatuses 3 to 8 and a signal corresponding to a predetermined number of chips of the reception signal from storage section 3003 after the start timing corresponding to path 3302 (*b*). In this way, a correlation value calculation result is obtained for each of mobile station apparatuses 3 to 8.

Second, channel estimation section 3006 searches from the correlation value calculation results in 2nd correlation section 3005 corresponding to mobile station apparatuses 3 to 8 those greater than the above threshold. If any one of the correlation value calculation results is greater than the threshold, path 3302 (*b*) can be decided as the path about the mobile station apparatus corresponding to this correlation value calculation result.

If a propagation delay of the path about a mobile station apparatus exceeds W chips, a path of a predetermined size is unlikely to appear in the W chip section corresponding to this mobile station apparatus in the case of the conventional system, and so it is difficult to detect a propagation delay about this mobile station apparatus. However, in the case of this embodiment, the above channel estimation is performed even in such a case, and so the path of the above mobile station apparatus is likely to be detected during channel estimation of one of the other mobile station apparatuses. Therefore, this embodiment ensures that a propagation delay about each mobile station apparatus is detected even if a propagation delay of the path about a mobile station apparatus exceeds W chips.

The channel estimation as described above is carried out for all channels and the channel estimation results are sent to correlation sections 3008 to 3010.

On the other hand, the above threshold is set, for example, as follows. That is, by using a relationship between the number of chips of the mid amble section used for correlation value calculation processing by 1st correlation section 3004 (here 456 chips) and the correlation value obtained by this correlation value calculation processing, if a predetermined number of chips (here 16 chips) of data section 1 is used, an approximate size of the correlation value expected to be obtained from 2nd correlation section 3005 is estimated. Thus, it is possible to use the value obtained by changing the estimated correlation value as appropriate as a threshold.

Furthermore, channel estimation section 3006 also detects a propagation delay of each channel through the channel estimation as described above. In this way, channel estimation section 3006 creates a time alignment control signal to perform time alignment control for each mobile station apparatus. That is, channel estimation section 3006 detects a propagation delay of each channel (mobile station apparatus), and so can set how much the transmission timing should be shifted for each channel so that a path can appear in a W chip section in a delay profile. Thus, channel estimation section 3006 can create a time alignment control signal to indicate the transmission timing to each channel. Therefore, this base station apparatus can perform transmission timing control for each mobile station apparatus.

Correlation sections 3008 to 3010 perform despreading processing on the reception signals from storage section 3003 based on the channel estimation result from channel estimation section 3006. That is, correlation sections 3008 to 3010 perform despreading processing on the reception signal from storage section 3003 at timing taking account of delay times of three paths estimated by channel estimation section 3006 for each channel.

Coherent detection sections 3011 to 3013 perform coherent detection processing on the signals subjected to despreading processing by correlation sections 3008 to 3010. The signals subjected to the coherent detection processing are combined by combination section 3014 and thereby a demodulated signal is obtained.

As shown above, this embodiment carries out correlation value calculation processing using a spreading code assigned to a mobile station apparatus corresponding to a W chip section in which a path existing in a delay profile obtained using a mid amble code and a signal corresponding to a predetermined number of chips of the reception signal after the start timing of the data section about the above mobile station apparatus estimated by this path, and then decides to which mobile station apparatus the path existing in the above delay profile corresponds based on this correlation value calculation processing result. This ensures that a propagation delay about each mobile station apparatus is detected even if such a mobile station apparatus exists whose total of a propagation delay and delay dispersion is longer than W chips. Thus, this embodiment can accurately detect a propagation delay about each mobile station apparatus without affecting the number of channels accommodated.

Moreover, the result of channel estimation described in this embodiment can be used for path restrictions in interference removal and demodulation processing.

As described above, the present invention performs channel estimation about each channel using a value of correlation between a reception signal and known reference signal and a value of correlation between the reception signal and spreading code specific to each channel, thus providing a communication apparatus capable of accurately detecting a propagation delay about each mobile station apparatus (each channel).

The present invention is not limited to the above described embodiments, and various variations and modifications may be possible without departing from the scope of the present invention.

This application is based on the Japanese Patent Application No. HEI 11-190050 filed on Jul. 5, 1999, the Japanese Patent Application No. HEI 11-331391 filed on Nov. 22, 1999 and the Japanese Patent Application No. 2000-068426 filed on Mar. 13, 2000, entire content of which is expressly incorporated by reference herein.

What is claimed is:

1. A midamble pattern assigning method for assigning a plurality of midamble patterns to a plurality of CDMA radio transmission apparatuses, the method comprising:
while a first CDMA radio transmission apparatus and a second CDMA radio transmission apparatus are engaged in communication, (i) at a first time unit, assigning a first midamble pattern to the first CDMA radio transmission apparatus and a second midamble pattern, which is different from the first midamble pattern, to the second CDMA radio transmission apparatus, and (ii) at a second time unit subsequent to the first time unit, assigning the first midamble pattern to the second CDMA radio transmission apparatus and the second midamble pattern to the first CDMA radio transmission apparatus, wherein:
step (i) and step (ii) are periodically repeated at a regular interval.

2. The midamble pattern assigning method according to claim 1, wherein the first midamble pattern and the second midamble pattern have a pattern length that is shorter than the first time unit and the second time unit.

3. The midamble pattern assigning method according to claim 1, wherein the first midamble pattern and the second midamble pattern are placed in a predetermined part of the first time unit and the second time unit.

4. The midamble pattern assigning method according to claim 1, wherein the first time unit and the second time unit have a length of one frame.

5. A midamble pattern assigning method for assigning a plurality of midamble patterns to a plurality of CDMA radio transmission apparatuses, the method comprising:
while a first CDMA radio transmission apparatus and a second CDMA radio transmission apparatus are engaged in communication, (i) to the first CDMA radio transmission apparatus, assigning a first midamble pattern at a first time unit and a second midamble pattern, which is different from the first midamble pattern, at a second time unit subsequent to the first time unit, and (ii) to the second CDMA radio transmission apparatus, assigning the second midamble pattern at the first time unit and the first midamble pattern at the second time unit, wherein:
step (i) and step (ii) are repeated in parallel periodically at a regular interval.

6. The midamble pattern assigning method according to claim 5, wherein the first midamble pattern and the second midamble pattern have a pattern length that is shorter than the first time unit and the second time unit.

7. The midamble pattern assigning method according to claim 5, wherein the first midamble pattern and the second midamble pattern are placed in a predetermined part of the first time unit and the second time unit.

8. The midamble pattern assigning method according to claim 5, wherein the first time unit and the second time unit have a length of one frame.

* * * * *